United States Patent
Weder

(10) Patent No.: US 6,656,593 B1
(45) Date of Patent: Dec. 2, 2003

(54) SCENTED DECORATIVE GRASS HAVING AN APPEARANCE SIMULATING THE APPEARANCE OF CLOTH

(75) Inventor: Donald E. Weder, Highland, IL (US)

(73) Assignee: Southpac Trust International, Inc., Rarotonga (CK)

( * ) Notice: Subject to any disclaimer, the term of this patent is extended or adjusted under 35 U.S.C. 154(b) by 166 days.

(21) Appl. No.: 09/702,459

(22) Filed: Oct. 31, 2000

Related U.S. Application Data

(63) Continuation-in-part of application No. 09/612,535, filed on Jul. 7, 2000, now Pat. No. 6,511,735.

(51) Int. Cl.[7] .............................................. B32B 17/00
(52) U.S. Cl. ...................... 428/409; 428/195; 428/401; 428/213
(58) Field of Search ................................. 428/195, 409, 428/401, 213, 194, 152, 161, 172, 190

(56) References Cited

U.S. PATENT DOCUMENTS

| | | | |
|---|---|---|---|
| 583,925 A | 6/1897 | McGowan | 206/423 |
| 1,794,212 A | 2/1931 | Snyder | 47/84 |
| 1,892,818 A | 1/1933 | Trew | |
| 2,268,244 A | 12/1941 | Davis | 53/419 |
| 2,679,887 A | 6/1954 | Doyle et al. | |
| 2,785,508 A | 3/1957 | Coleman, Jr. | 47/72 |
| 3,058,263 A | 10/1962 | Reynolds | D11/152 |
| 3,660,187 A | 5/1972 | Shortway et al. | |
| 3,962,503 A | 6/1976 | Crawford | 428/40 |
| 4,056,646 A | 11/1977 | Westfall et al. | |
| 4,104,845 A | 8/1978 | Hoffman | 53/410 |
| 4,199,627 A | 4/1980 | Weder et al. | 428/7 |
| 4,216,620 A | 8/1980 | Weder et al. | 47/72 |
| 4,248,347 A | 2/1981 | Trimbee | 206/423 |
| 4,292,266 A | 9/1981 | Weder et al. | 264/140 |
| 4,359,442 A | 11/1982 | Cleminson et al. | |
| 5,038,930 A | 8/1991 | Holtkamp, Jr. | 206/423 |
| 5,065,925 A | 11/1991 | Harris | 206/423 |
| 5,088,972 A | 2/1992 | Parker | 493/352 |
| 5,094,060 A | 3/1992 | Caird | 53/390 |
| 5,134,013 A | 7/1992 | Parker | 428/182 |
| 5,173,352 A | 12/1992 | Parker | 428/174 |
| 5,200,253 A | 4/1993 | Yamaguchi et al. | 428/195 |
| 5,254,111 A | 10/1993 | Cancio et al. | |
| 5,296,184 A | 3/1994 | Wu et al. | |
| 5,345,745 A | 9/1994 | Weder | 53/397 |
| 5,403,259 A | 4/1995 | Parker | 493/352 |
| D368,654 S | 4/1996 | Santoiemmo et al. | D9/415 |
| 5,573,491 A | 11/1996 | Parker | 193/352 |
| 5,656,008 A | 8/1997 | Beierlorzer | 493/346 |
| 5,712,020 A | 1/1998 | Parker | 428/182 |
| 5,871,432 A | 2/1999 | Beierlorzer | 493/352 |
| 5,897,926 A | 4/1999 | Mikulas | 428/17 |
| 5,906,569 A | 5/1999 | Miyamoto et al. | 29/564.1 |
| 5,921,907 A | 7/1999 | Beierlorzer | 493/357 |

FOREIGN PATENT DOCUMENTS

| | | | |
|---|---|---|---|
| DE | 2147277 | 5/1973 | 53/136.2 |
| DE | 2948265 | 5/1981 | 206/423 |
| WO | 9916615 | 4/1999 | |

OTHER PUBLICATIONS

Speed Cover ®, The Simple Solution For These Peak Vol. Periods, Highland Supply Corporation, 1989.

*Primary Examiner*—Merrick Dixon
(74) *Attorney, Agent, or Firm*—Dunlap, Codding & Rogers, P.C.

(57) ABSTRACT

Scented decorative grasses having an appearance and/or texture simulating the appearance and/or texture of cloth are disclosed, as are methods for making such scented decorative grasses from materials wherein at least one surface of the material is modified to simulate the appearance and/or texture of cloth.

42 Claims, 10 Drawing Sheets

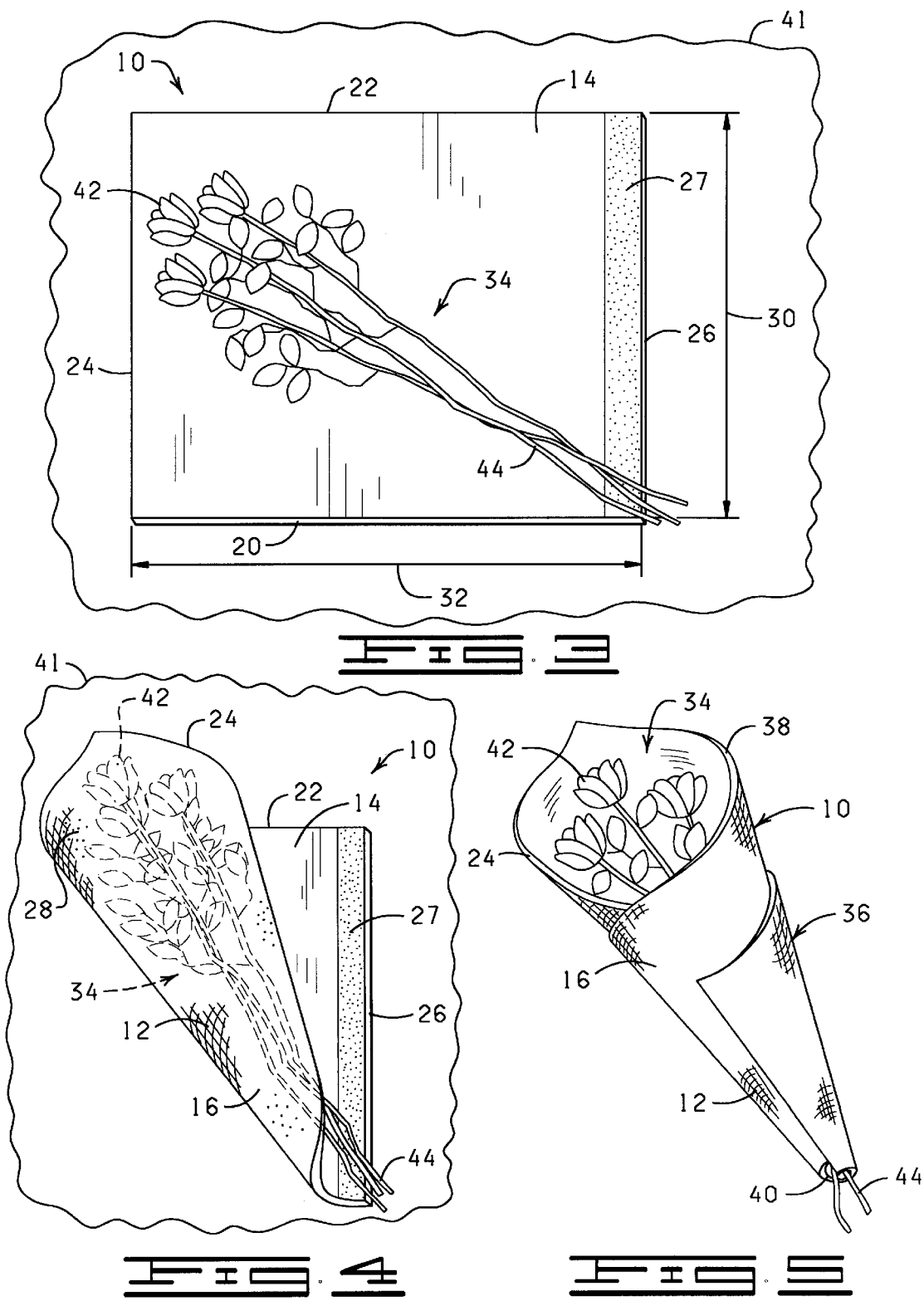

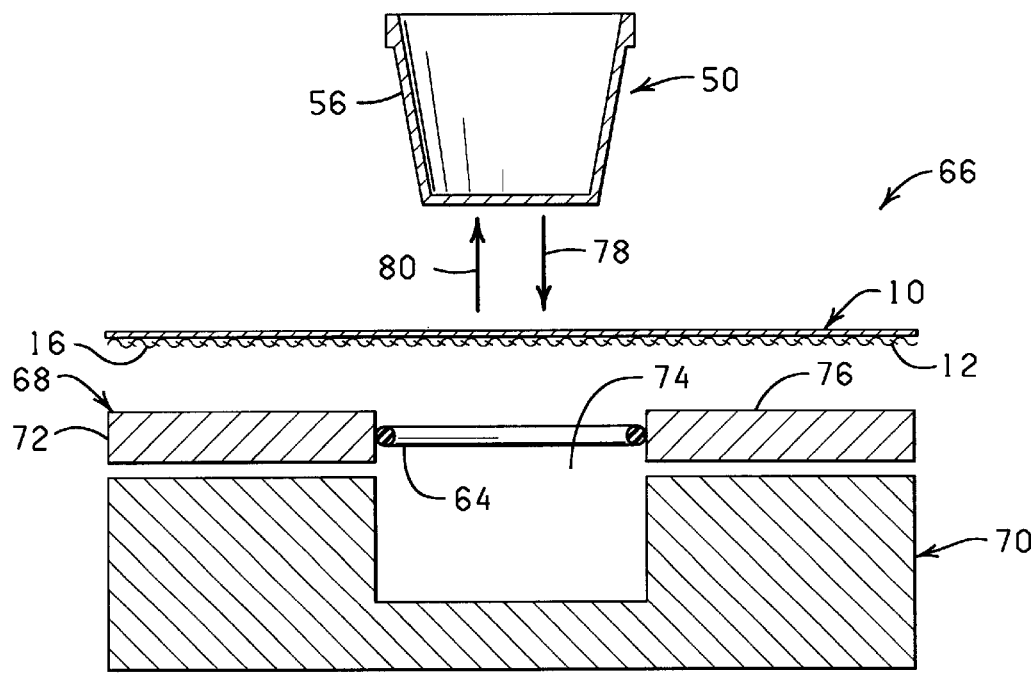
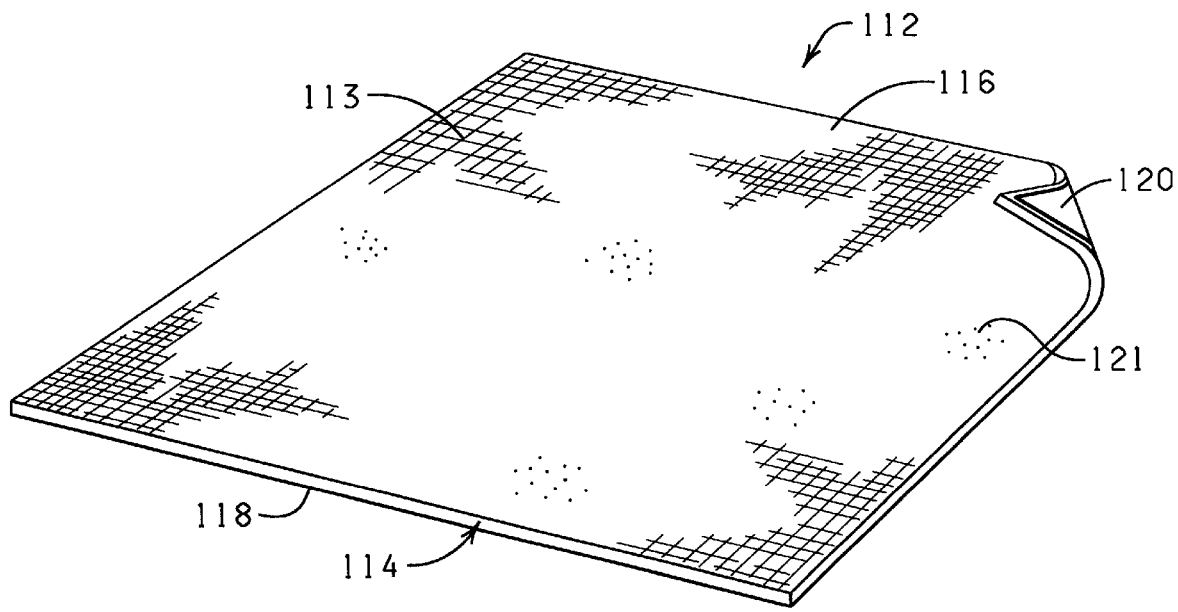

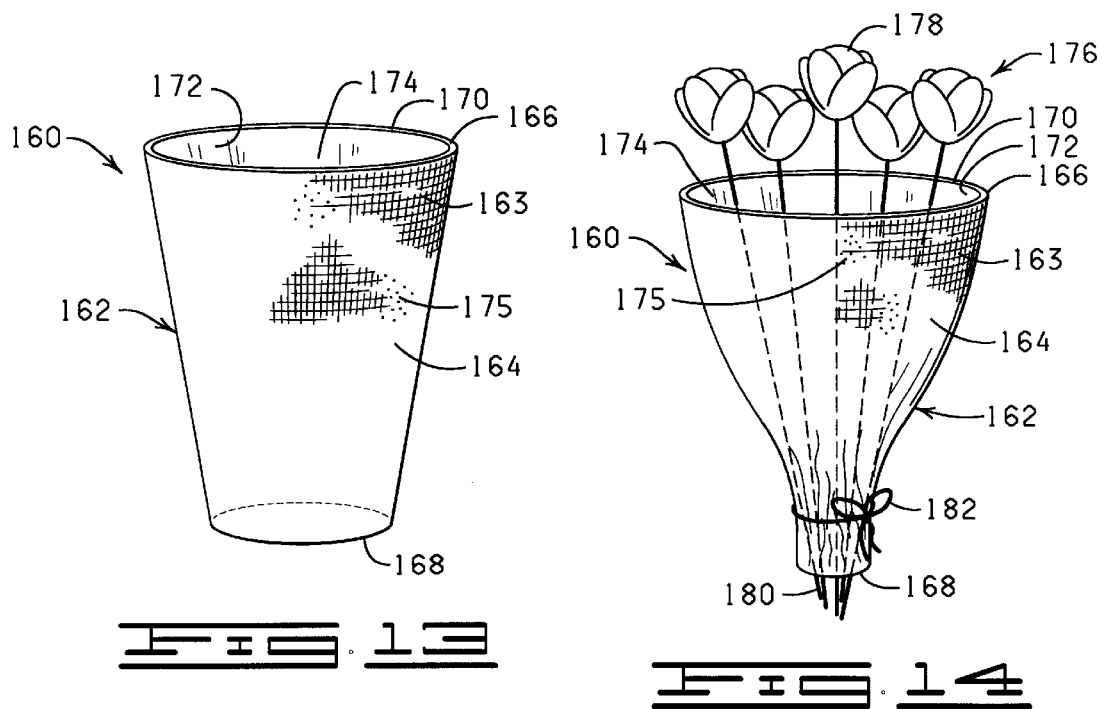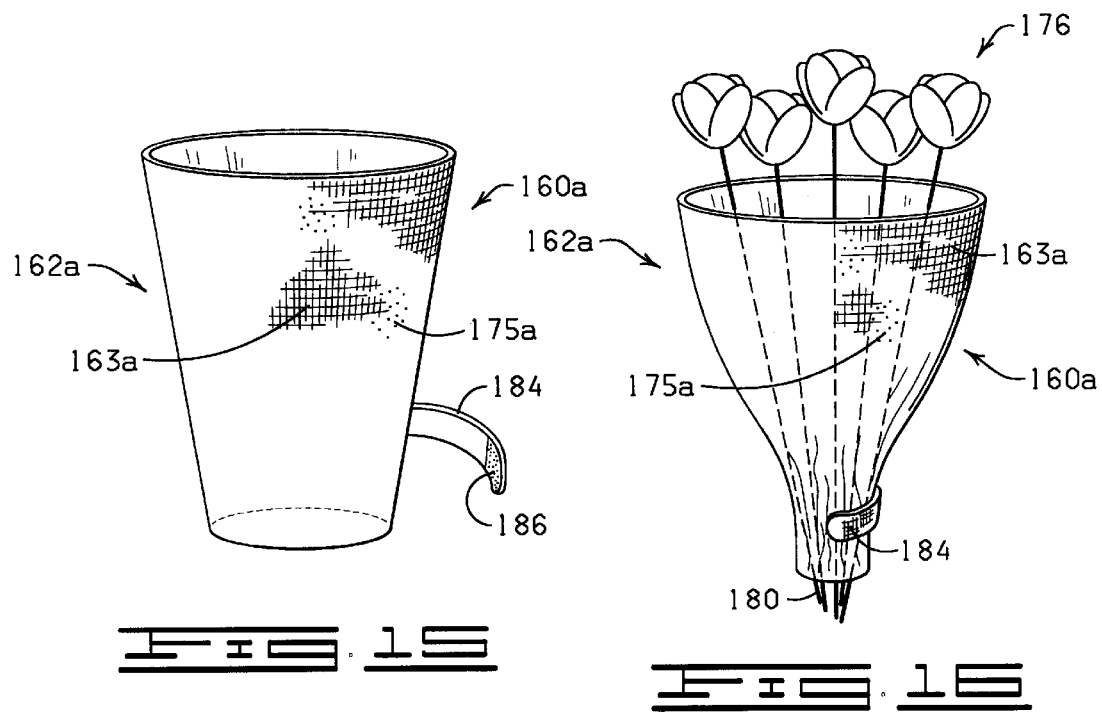

SCENTED DECORATIVE GRASS HAVING AN APPEARANCE SIMULATING THE APPEARANCE OF CLOTH

CROSS REFERENCE TO RELATED APPLICATIONS

This application is a continuation-in-part of U.S. Ser. No. 09/612,535 now U.S. Pat. No. 6,511,735 filed Jul. 7, 2000, entitled "DECORATIVE GRASS HAVING AN APPEARANCE SIMULATING THE APPEARANCE OF CLOTH".

STATEMENT REGARDING FEDERALLY SPONSORED RESEARCH OR DEVELOPMENT

Not applicable.

FIELD OF THE INVENTION

The present invention relates to scented polymeric materials having an appearance simulating the appearance of cloth on a surface thereof, and more particularly but not by way of limitation, to scented flower pot covers, scented floral wrappings, scented ribbon materials and scented decorative grasses made from such scented polymeric materials. In one aspect, the present invention relates to methods for producing scented flower pot covers and methods of wrapping floral groupings and flower pots with a scented sheet of polymeric material having an appearance simulating the appearance of cloth on a surface thereof to provide a scented decorative cover for such floral groupings and flower pots. In yet another aspect, the present invention relates to methods of producing scented decorative grasses having an appearance or texture simulating the appearance or texture of cloth.

BRIEF DESCRIPTION OF THE DRAWINGS

FIG. 3 is a perspective view of the scented sheet of polymeric material having a finish simulating the appearance of cloth on a surface thereof of FIG. 2 having a floral grouping disposed thereon.

FIG. 4 is a perspective view of the floral grouping of FIG. 3 being wrapped with the scented sheet of polymeric material having a finish simulating the appearance of cloth on a surface thereof of FIG. 2 by one method of wrapping.

FIG. 6 is a perspective view of a scented decorative cover formed from the scented sheet of polymeric material of FIG. 2 wherein a floral grouping is wrapped with the scented sheet of polymeric material having a finish simulating the appearance of cloth on a surface thereof by a second method of wrapping so that the scented decorative cover having a finish simulating the appearance of cloth on a surface thereof has a substantially cylindrical configuration.

FIG. 8 is a cross-sectional view of a flower pot cover former and band applicator apparatus having the scented sheet of polymeric material having a finish simulating the appearance of cloth on a surface thereof of FIG. 1 disposed above an opening of the flower pot cover former and band applicator and having a flower pot disposed above the scented sheet of polymeric material having a finish simulating the appearance of cloth on a surface thereof.

FIG. 9A is a perspective view of a scented sheet of expanded core polymeric film having a finish simulating the appearance of cloth on a surface thereof wherein an acrylic heat sealable lacquer is disposed on at least one surface thereof, one corner of the scented sheet of expanded core polymeric film upwardly turned.

FIG. 13 is a perspective view of a scented floral sleeve formed from the scented sheet of polymeric material having a finish simulating the appearance of cloth on a surface thereof.

FIG. 14 is a perspective view of the scented floral sleeve of FIG. 13 disposed about a floral grouping.

FIG. 15 is a perspective view of a scented floral sleeve having a cinching member wherein the scented floral sleeve is formed from a scented sheet of polymeric material having a finish simulating the appearance of cloth on a surface thereof.

FIG. 16 is a perspective view of the scented floral sleeve of FIG. 15 disposed about a floral grouping.

DETAILED DESCRIPTION OF THE INVENTION

Description of FIGS. 1–9

Figure 1:
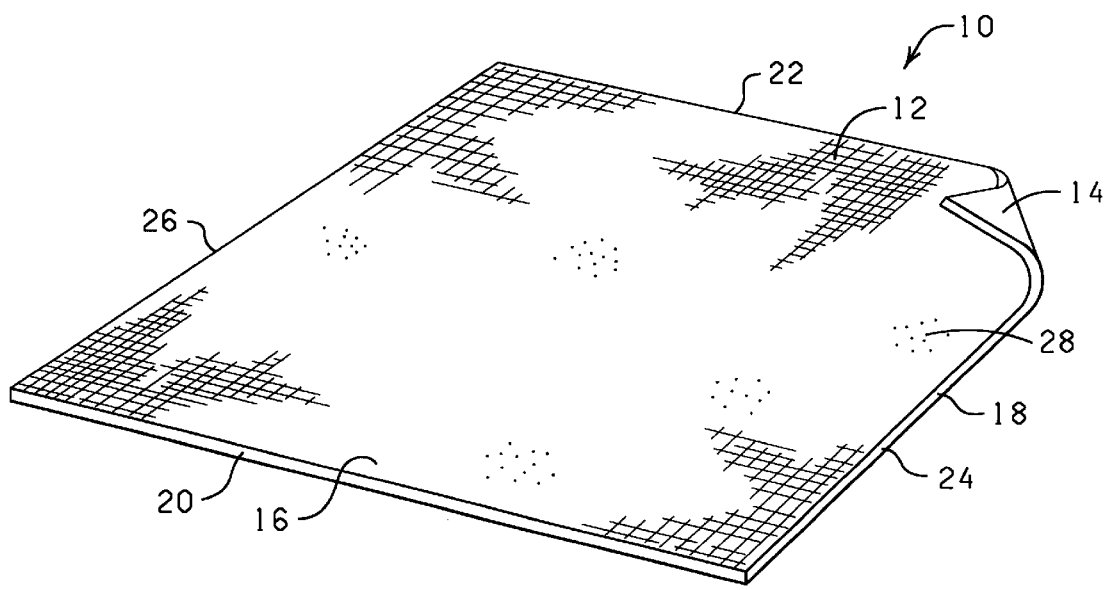
FIG. 1 is a perspective view of a scented sheet of polymeric material having a finish simulating the appearance of cloth on a surface thereof constructed in accordance with the present invention, one corner of the scented sheet of polymeric material turned upwardly.
Figure 2:
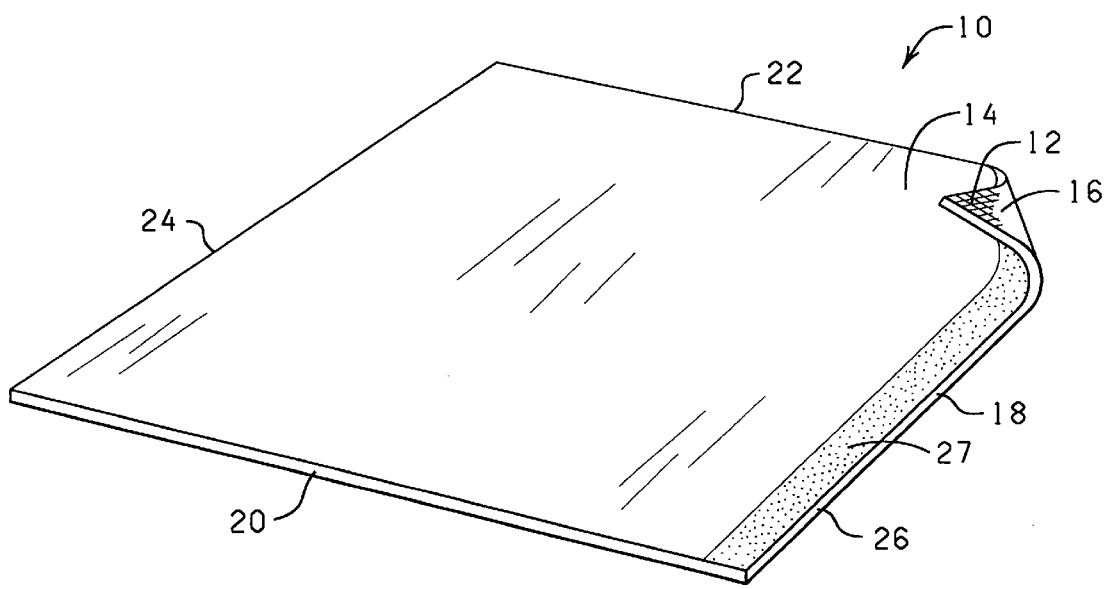
FIG. 2 is a perspective view of the scented sheet of polymeric material having a finish simulating the appearance of cloth on a surface thereof of FIG. 1 wherein a bonding material is disposed along one edge thereof, one corner of the scented sheet of polymeric material upwardly turned.

Referring now to FIGS. 1 and 2, designated generally by the reference numeral 10 is a scented sheet or web of polymeric material having a texture. and/or appearance 12 simulating the texture and/or appearance of cloth (hereinafter referred to as the scented sheet of polymeric material 10 or the scented sheet of polymeric material 10 having a cloth-like appearance). That is, at least one surface of the scented sheet of polymeric material 10 has been modified to provide a matte or textured finish 12 simulating the appearance and/or texture of cloth. The term "finish simulating the appearance of cloth" may be used interchangeably with the terms "cloth-appearing textured or matte finish", "cloth-like finish" and "cloth-like appearance".

The term "appearance or texture simulating the appearance or texture of cloth" as used herein will be understood to include textures and/or appearances and/or surface modifications of a polymeric material such that the polymeric material is provided with at least one surface thereof which simulates the texture or appearance of a woven material, a nonwoven material, a welded material, a spun bonded material, or a knitted or pressed fabric of fibrous material. The term "appearance or texture simulating the appearance or texture of cloth" as used herein will also be understood to include textures and/or appearances simulating the texture or appearance of cotton, wool, silk, hair, burlap, and linen, as well as synthetic fibers such as rayon and polyester, and blends thereof, such as denim. While different types of cloth have been disclosed hereinabove, it will be understood that a polymeric material having at least one surface thereof modified such that the surface is provided with a texture or appearance simulating the texture or appearance of cloth of the present invention will not be limited to appearances simulating the types of cloth described herein, and the texture or appearance may simulate other types of cloth which fall within the scope of the invention.

The modification of the scented sheet of polymeric material 10 to provide the sheet of polymeric material with a matte or textured finish 12 simulating the appearance and/or texture of cloth can be accomplished in several ways. For example, a matte finish can be provided by printing a desired pattern on the sheet of polymeric material and thereafter laminating a matte material, such as a translucent polymeric film, over the printed pattern. To further enhance the appearance or texture 12 simulating the appearance or texture of cloth of the scented sheet of polymeric material 10, the matte material may or may not have a plurality of spatially disposed holes extending therethrough. A matte or textured finish simulating the appearance of cloth can also be produced by printing a sheet of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the weave or texture of cloth, or by flocking the sheet of polymeric material, or by application of a foamable lacquer or foamable ink to the sheet of polymeric material, or by embossing and printing the sheet of polymeric material to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable of providing the sheet of polymeric material with a texture and/or appearance simulating the texture and/or appearance of cloth can be achieved by extruding a polymeric resin onto a matted or textured chill roll or by laminating a second sheet of material to the sheet of polymeric material. The texture and/or appearance 12 simulating the texture and/or appearance of cloth can also be achieved by flocking the scented sheet of polymeric material 10 or by application of a foamable lacquer or foamable ink to the scented sheet of polymeric material 10.

The scented sheet of polymeric material 10 having an appearance and/or texture 12 simulating the appearance and/or texture of cloth has an upper surface 14, a lower surface 16, and an outer peripheral edge 18. At least one surface of the scented sheet of polymeric material 10, such as the lower surface 16, is matted or textured as described above to provide the scented sheet of polymeric material 10 with an appearance and/or texture 12 simulating the appearance and/or texture of cloth. The outer peripheral edge 18 of the scented sheet of polymeric material 10 comprises a first side 20, a second side 22, a third side 24, and a fourth side 26. A bonding material 27 (FIG. 2) may be disposed on at least a portion of one or both of the upper and lower surfaces 14 and 16 of the scented sheet of polymeric material 10, such as the upper surface 14 thereof as shown in FIG. 2 and as further illustrated in U.S. Pat. No. 5,181,364, entitled "WRAPPING A FLORAL GROUPING WITH SHEETS HAVING ADHESIVE OR COHESIVE MATERIAL APPLIED THERETO", issued to Weder on Jan. 26, 1993, the specification of which is hereby expressly incorporated herein by reference.

Figure 20A:
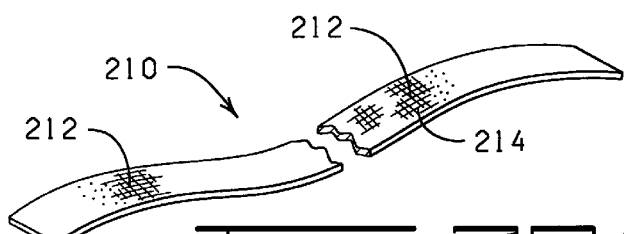
FIG. 20A is a perspective view of a scented polymeric ribbon material having a finish simulating the appearance of cloth on a surface thereof.
Figure 20B:
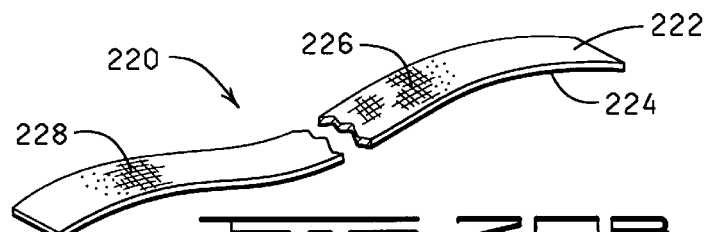
FIG. 20B is a perspective view of a scented polymeric ribbon material formed of an expanded core polymeric film and having a finish simulating the appearance of cloth on a surface thereof.
Figure 20C:
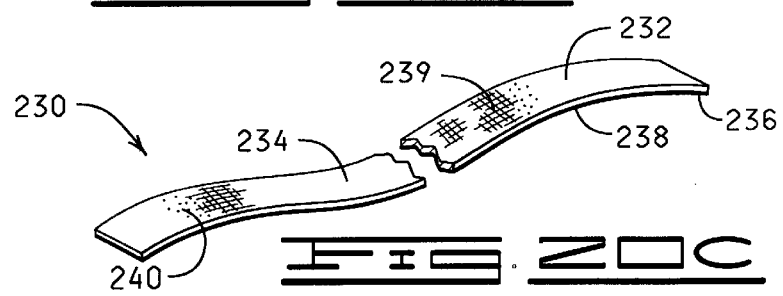
FIG. 20C is a perspective view of a scented laminated polymeric ribbon wherein at least one surface of the scented laminated polymeric ribbon is modified or textured to provide the scented laminated polymeric ribbon with a finish simulating the appearance of cloth.
Figure 21:
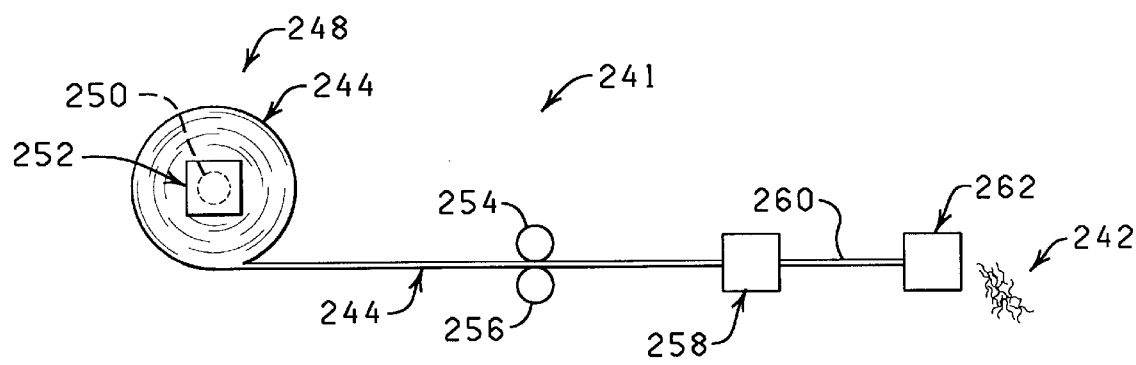
FIG. 21 is a schematic representation of a system for making scented decorative grass having a texture or appearance simulating the texture or appearance of cloth in accordance with the present invention.
Figure 22A:
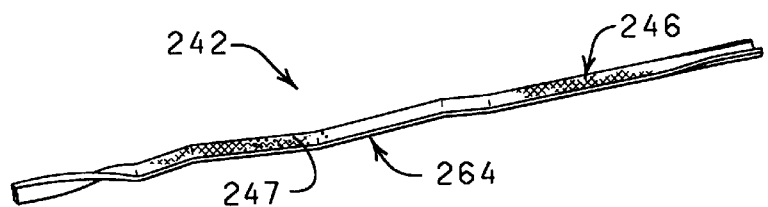
FIG. 22A is a perspective view of a segment of scented decorative grass having a finish simulating the appearance of cloth produced from a scented polymeric material having a finish simulating the appearance of cloth on a surface thereof.
Figure 22B:
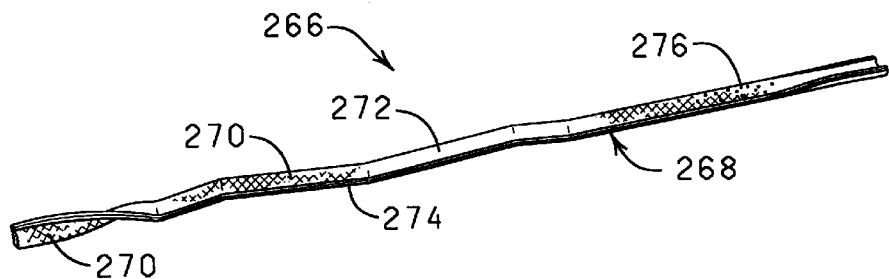
FIG. 22B is a perspective view of a segment of scented decorative grass having a finish simulating the appearance of cloth produced from a scented laminated polymeric material having a finish simulating the appearance of cloth on a surface thereof.

The scented sheet of polymeric material 10 having at least one surface thereof modified so as to provide the scented sheet of polymeric material 10 with an appearance and/or texture 12 simulating the appearance and/or texture of cloth may be employed to provide a scented decorative cover for a floral grouping (FIGS. 3 through 6); or to form a scented decorative cover for a flower pot (FIG. 7); or to form a scented preformed flower pot cover for covering a flower pot (FIGS. 10 and 11); or to provide a scented sleeve for wrapping or covering a floral grouping (FIGS. 13 through 16) or a flower pot (FIGS. 17 through 19); or to provide a scented ribbon material having an appearance and/or texture simulating the appearance and/or texture of cloth (FIG. 20A through 20C); or to produce scented decorative grass (FIGS. 21 through 22B). The use of the scented sheet of polymeric material 10 having an appearance and/or texture 12 simulating the appearance and/or texture of cloth to form a scented decorative cover for a floral grouping or a flower pot, or to form a scented sleeve for a floral grouping or a flower pot, or to form a scented preformed flower pot cover, or as a scented ribbon material or to produce scented decorative grasses will be described in more complete detail herein.

The sheet of polymeric material 10 is further provided with a scent 28 disposed on at least a-portion of one of the upper and lower surfaces 14 and 16 thereof, such as the lower surface 16 as shown in FIG. 1. The term "scent" as used herein refers to any odor or combination of odors normally associated with an object, such as a fruit, vegetable, or spice, and which are desired for a particular application. Examples of such scents include odors normally associated with flowers, plants, fruits, vegetables, foods, grasses, food condiments (such as honey, sugar, salt), herbs, spices, woods, roots and the like. Such scents are known in the art and are commercially available. The scent 28 may be applied to the sheet of polymeric material 10 prior to or following application of the texture or appearance 12 simulating the texture or appearance of cloth. Alternatively, the scent 28 may be applied simultaneously with the application of the texture or appearance 12 simulating the texture or appearance of cloth, such as by incorporation of the scent 28 in an ink or foamable ink which is printed on the sheet of polymeric material 10 or a lacquer or foamable lacquer which is disposed on the sheet of polymeric material 10 to provide the texture or appearance 12 simulating the texture or appearance of cloth. In a further alternative, the scent 28 may be incorporated into the resin from which the sheet of polymeric material 10 is formed prior to formation of the sheet of polymeric material 10.

The scent 28 applied to the sheet of polymeric material 10 may be indicative of a characteristic of an intended use of the sheet of polymeric material 10. For example, a sheet of polymeric material 10 formed into a decorative cover or sleeve for a floral grouping or flower pot may be scented with an odor normally associated with a particular flower, such as roses, lilacs gardenias, wisteria, hydrangea, honeysuckle, and the like, or a particular plant, such as aloe vera, mint, eucalyptus or evergreen. In addition, decorative grass formed from the sheet of polymeric material 10 may be scented with an odor normally associated with a particular object packaged in a container in which the decorative grass serves as a packing material, such as fruits and vegetables, including peaches, grapes, apples, oranges, lemons, limes, raspberries, bananas, cranberries, pumpkins and the like, or brands of perfumes, or spices, such as sage, cinnamon, vanilla and the like. Further, the sheet of polymeric material 10 may also be scented with an odor normally associated with a particular type of cloth which the sheet of polymeric material 10 simulates in texture and appearance. For example, raw silk has a unique texture as well as odor, and the sheet of polymeric material 10 may be scented with the odor normally associated with raw silk.

As noted above, the scented sheet of polymeric material 10 having the appearance and/or texture 12 simulating the appearance and/or texture of cloth can be utilized to form a scented decorative cover for a floral grouping or a flower pot. The term "flower pot" as used herein refers to any type of container for holding a floral grouping, or a plant, or even another pot-type container. Examples of flower pots and/or pot-type containers include, but are not limited to, clay pots, wooden pots, plastic pots, pots made from natural and/or synthetic fibers, or any combination thereof. Such flower pots and/or pot-type containers are provided with a retaining space for receiving a floral grouping. The floral grouping may be disposed within the retaining space of the flower pot with a suitable growing medium described in further detail below, or other retaining medium, such as a floral foam. It will also be understood that in some cases the floral grouping, and any appropriate growing medium or other retaining medium, may be disposed in a scented sleeve formed from the scented sheet of polymeric material 10 if the scented sleeve is adapted to contain a medium.

"Floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. Further, the floral grouping may comprise a growing potted plant having a root portion as well. However, it will be appreciated that the floral grouping may consist of only a single bloom or only foliage, or a botanical item (not shown), or a propagule. The term "floral grouping" may be used interchangeably herein with the term "floral arrangement". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singularly or in combination. The term "botanical item" also means any portion or portions of natural or artificial herbaceous or woody plants including stems, leaves, flowers, blossoms, buds, blooms, cones, or roots, taken singularly or in combination, or in groupings of such portions such as bouquets or floral groupings.

The term "propagule" when used herein means any structure capable of being propagated or acting as an agent of reproduction including seeds, shoots, stems, runners, tubers, plants, leaves, roots or spores.

In the embodiments shown in the drawings, the scented sheet of polymeric material 10 having an appearance and/or texture 12 simulating the appearance and/or texture of cloth is square. It will be appreciated, however, that the scented sheet of polymeric material 10 having an appearance and/or texture 12 simulating the appearance and/or texture of cloth can be of any shape, configuration or size as long as the scented sheet of polymeric material 10 is sufficiently sized and shaped to wrap and encompass a floral grouping or a flower pot. For example, the scented sheet of polymeric material 10 may have a rectangular, round, oval, octagonal or asymmetrical shape. Further, multiple scented sheets of polymeric material 10 may be used in a single circumstance to provide a scented decorative cover or a scented sleeve for a floral grouping or a flower pot. Moreover, when multiple scented sheets of polymeric material 10 having an appearance and/or texture 12 simulating the appearance and/or texture of cloth are used in combination, the sheets of polymeric material 10 need not-be uniform in size or shape.

Finally, it will be appreciated that the scented sheet of polymeric material 10 having an appearance and/or texture 12 simulating the appearance and/or texture of cloth shown herein is a substantially flat sheet except for the texturing, matting, embossing, flocking, application of a foamable lacquer or foamable ink, or other treatments and techniques employed to provide the scented sheet of polymeric material 10 with the desired texture or matting so that the scented sheet of polymeric material 10 has the appearance of cloth.

Any thickness or stiffness of the scented sheet of polymeric material 10 may be utilized in accordance with the present invention as long as at least one surface of the scented sheet of polymeric material 10 can be modified to provide the sheet of polymeric material with an appearance and/or texture 12 simulating the appearance and/or texture of cloth and the scented sheet of polymeric material 10 having an appearance and/or texture 12 simulating the appearance and/or texture of cloth can be wrapped about at least a portion of a floral grouping or a flower pot, as described herein. Generally, the scented sheet of polymeric material 10 will have a thickness in a range of from about 0.1 mil to about 30 mil, and more desirably a thickness in a range of from about 0.5 mil to about 10 mil.

The terms "polymer film", "polymeric film" and "polymeric material" when used herein refers to a synthetic polymer such as a polypropylene or a polyethylene, a naturally occurring polymer such as cellophane, an extruded polymeric material having an expanded core such as extruded polypropylene having an expanded core and combinations thereof. The extruded polymeric material having an expanded core may also be referred to herein as an expanded core polymeric material.

"Extruded polymeric material having an expanded core" or "expanded core polymeric film" as used herein refers to any extrudable polymeric material or polymeric film in which the core is expanded during extrusion, such as by incorporation of a blowing agent in the polymeric resin which is being extruded.

The scented sheet of polymeric material 10 may also be constructed, in whole or in part, from a cling material. "Cling material" when used herein refers any material which is capable of connecting to the sheet of material and/or itself upon contacting engagement during the wrapping process and is wrappable about an item whereby portions of the cling material contactingly engage and connect to other portions of another material, or, alternatively to itself, for generally securing the material wrapped about at least a portion of a flower pot. This connecting engagement is preferably temporary in that the material may be easily removed, i.e., the cling material "clings" to the flower pot.

The cling material is constructed from polyethylene such as Cling Wrap made by Glad®, First Brands Corporation, Danbury, Conn., and treated if necessary. The thickness of the cling material will depend, in part, upon the size of sleeve or cover and the size of the flower pot or floral grouping in the sleeve or cover, i.e., generally, a larger flower pot may require a thicker and therefore stronger cling material than a smaller flower pot or floral grouping. The cling material will range in thickness from about 0.1 mil to about 10 mil, and more desirably from about 0.5 mil to about 2.5 mil. However, any thickness of cling material may be utilized in accordance with the present invention which permits the cling material to be modified as hereinbefore described to provide the cling material with an appearance and/or texture simulating the appearance and/or texture of cloth.

Figure 9B:
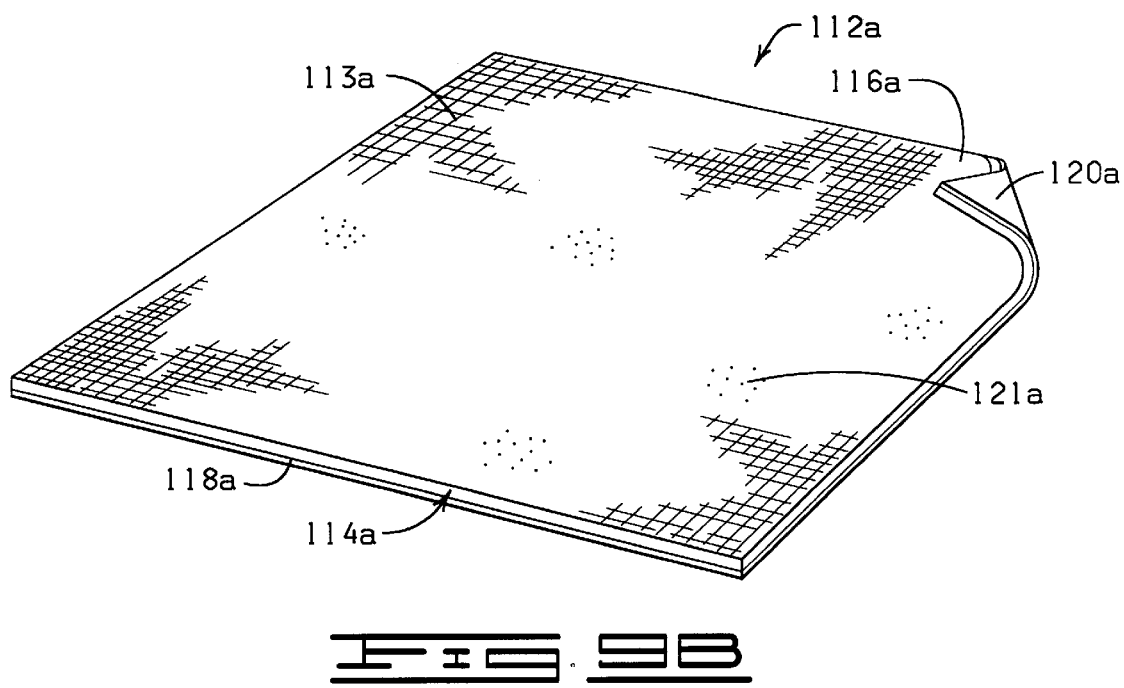
FIG. 9B is a perspective view of a scented sheet of laminated material wherein one surface is modified or textured to provide the scented sheet of laminated material with a finish simulating the appearance of cloth on a surface thereof, one corner of the scented sheet of laminated material upwardly turned.

A scented decorative cover for a floral grouping (FIGS. 3 through 6), or a scented decorative cover for a flower pot (FIG. 7), or a scented preformed flower pot cover for covering a flower pot (FIGS. 10 and 11), or a scented sleeve for wrapping or covering a floral grouping (FIGS. 13 through 16) or a flower pot (FIGS. 17 through 19), or a scented ribbon material having an appearance and/or texture simulating the appearance and/or texture of cloth (FIGS. 20A through 20C), or scented decorative grass (FIGS. 21 through 22B) may also be constructed of a scented laminated material (FIG. 9B). The scented laminated material having at least one surface thereof modified to provide the laminated material with an appearance and/or texture simulating the appearance and/or texture of cloth can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) to paper, metallized foil and the like, wherein at least one surface of the scented laminated material is textured or modified to assimilate the weave or texture of cloth. The only requirements in using a scented laminated material having an appearance and/or texture simulating the appearance and/or texture of cloth to form a scented decorative cover for a floral grouping, or a scented decorative cover for a flower pot, or a scented preformed flower pot cover for covering a flower pot, or a scented sleeve for wrapping or covering a floral grouping or a flower pot, or as scented ribbon material or scented decorative grass in accordance with the present invention is that at least one surface of the scented laminated material be capable of being modified to provide the scented laminated material with at least one surface having an appearance and/or texture simulating the appearance and/or texture of cloth and that the scented laminated material be sufficiently flexible or pliable to permit the laminated material to be formed into a scented decorative cover for a floral grouping, or a scented decorative cover for a flower pot, or a scented preformed flower pot cover for covering a flower pot, or a scented sleeve for wrapping or covering a floral grouping or a flower pot, or to be used as scented ribbon material or scented decorative grass. It should also be noted that two or more separate sheets of material can be used to form a scented decorative cover for a floral grouping, or a scented decorative cover for a flower pot, or a scented preformed flower pot cover for covering a flower pot, or a scented sleeve for wrapping or covering a floral grouping or a flower pot as long as one of the sheets of material is modified or textured to provide same with an appearance and/or texture simulating the appearance and/or texture of cloth.

The scented sheet of polymeric material 10 or a scented laminated material (FIG. 9B) having an appearance and/or texture simulating the appearance and/or texture of cloth may vary in color. Further, the scented sheet of polymeric material 10 or a scented laminated material may comprise other decorative patterns or designs in addition to the matting, texturing, flocking, application of foamable lacquers or foamable inks, or embossing employed to impart the appearance and/or texture 12 simulating the appearance and/or texture of cloth to the scented sheet of polymeric material or the scented laminated material.

As illustrated in FIG. 3, the scented sheet of polymeric material 10 has a width 30 extending generally between the first side 20 and the second side 22, respectively, sufficiently sized whereby the scented sheet of polymeric material 10 can be wrapped about and encompass a floral grouping or a flower pot. The scented sheet of polymeric material 10 has a length 32 extending generally between the third side 24 and the fourth side 26 thereof, respectively, sufficiently sized whereby the scented sheet of polymeric material 10 extends over a substantial portion of the floral grouping when the scented sheet of polymeric material 10 has been wrapped about the floral grouping in accordance with the present invention, as described in detail herein. The scented sheet of polymeric material 10 may also be wrapped about a flower pot to substantially wrap and cover the flower pot in accordance with the present invention.

A plurality of scented sheets of polymeric material 10 having the appearance and/or texture 12 simulating the appearance and/or texture of cloth may be connected together to form a roll as is shown in U.S. Pat. No. 5,459,976, issued to Weder et al. on Oct. 24, 1995, entitled "MATERIAL AND ADHESIVE STRIP DISPENSER", the specification of which is hereby expressly incorporated in its entirety herein by reference.

Figure 5:
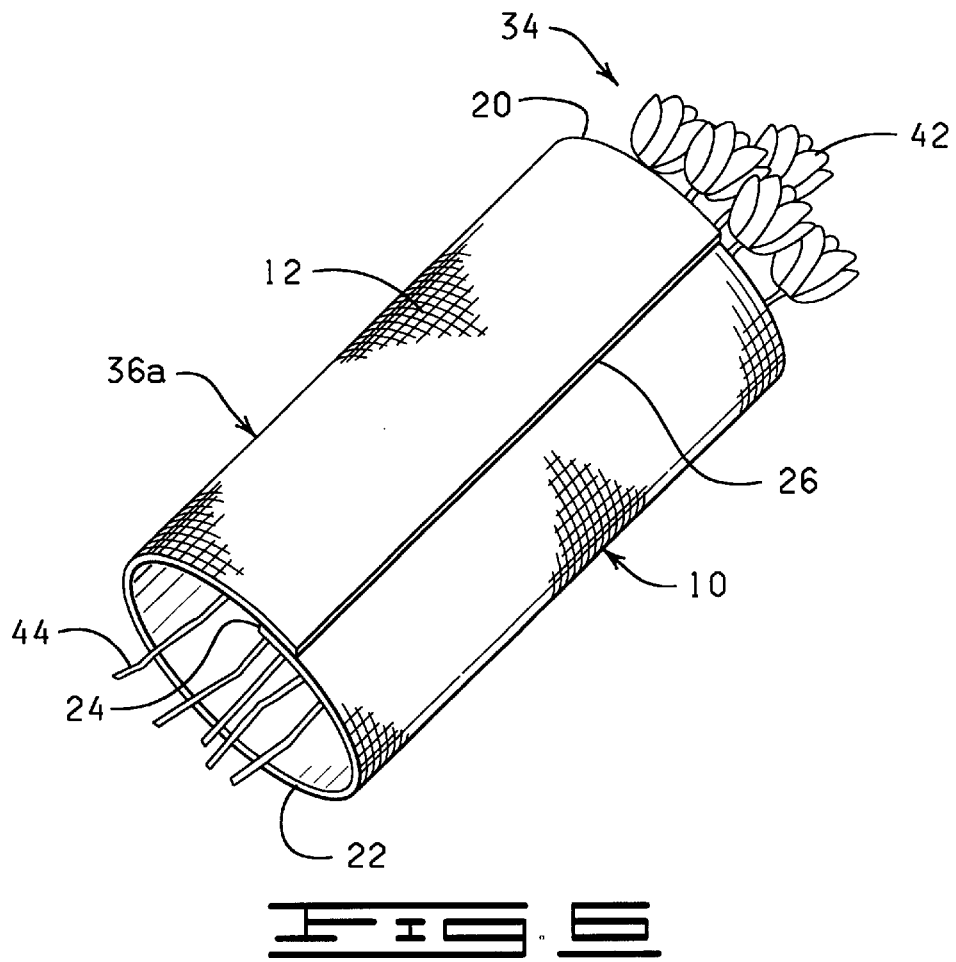
FIG. 5 is a perspective view of a scented decorative cover for the floral grouping formed from the scented sheet of polymeric material of FIG. 2 wherein the scented decorative cover formed from the scented sheet of polymeric material has a conical configuration.

FIGS. 3–5 illustrate the use of the scented sheet of polymeric material 10 having an appearance and/or texture 12 simulating the appearance and/or texture of cloth in wrapping a floral grouping 34 to provide a scented decorative cover 36 (FIG. 5) for the floral grouping 34, wherein the scented decorative cover 36 has an open upper end 38 and a lower end 40. The scented sheet of polymeric material 10 has a strip of bonding material disposed upon the upper surface 14 and/or the lower surface 16 thereof, such as the strip of bonding material 27 disposed along at least a portion of the upper surface 14 of the scented sheet of polymeric material 10 so as to be disposed substantially adjacent the fourth side 26 thereof, substantially as shown in FIGS. 3 and 4. Further, the scented sheet of polymeric material 10 having the appearance and/or texture 12 simulating the appearance and/or texture of cloth can be provided either as an individual sheet or from a pad or roll of material.

The bonding material 27 may have a backing or release strip (not shown). The backing or release strip may be left applied for a period of time to the bonding material 27 after it is disposed on a surface of the scented sheet of polymeric material 10 prior to its use as a wrapping material to protect the bonding qualities of the strip of bonding material 27.

In operation, an operator may dispose the scented sheet of polymeric material 10 having the appearance and/or texture 12 simulating the appearance and/or texture of cloth on a support surface 41 such that the lower surface 16 of the scented sheet of polymeric material 10 (which has been modified to provide the scented sheet of polymeric material 10 with the appearance and/or texture 12 simulating the appearance and/or texture of cloth) is in contact with the support surface 41.

Referring more specifically to FIGS. 3–5, the floral grouping 34 is placed upon the upper surface 14 of the scented sheet of polymeric material 10 in a diagonal orientation. The floral grouping 34 has an upper bloom or foliage portion 42 and a lower stem portion 44. The scented sheet of polymeric material 10 is then wrapped about the floral grouping 34 by the operator (FIGS. 4 and 5), the operator overlapping a portion of the scented sheet of polymeric material 10 over another portion of the scented sheet of polymeric material 10. That is, for example, the operator places the first side 20 of the scented sheet of polymeric material 10 over the floral grouping 34, as shown in FIG. 4. The operator rolls the floral grouping 34 and the scented sheet of polymeric material 10 in the direction toward the second side 22 of the scented sheet of polymeric material 10 (FIG. 4) until the upper surface 14 near the fourth side 26 firmly engages the lower surface 16 of the scented sheet of polymeric material 10, wherein the floral grouping 34 is substantially encompassed by the scented sheet of polymeric material 10, and wherein the bonding material 27 contacts the scented sheet of polymeric material 10 to provide the scented decorative cover 36 (FIG. 5) having the appearance and/or texture 12 simulating the appearance and/or texture of cloth which substantially encompasses and surrounds a substantial portion of the floral grouping 34. FIG. 5 shows the floral grouping 34 wrapped in a conical fashion to provide the scented decorative cover 36 for the floral grouping 34 which has the appearance of being made of a cloth material. When the floral grouping 34 is wrapped in a conical fashion, the bloom portion 42 of the floral grouping 34 is positioned substantially adjacent the open upper end 38 of the scented decorative cover 36, and the stem portion 44 of the floral grouping 34 is positioned substantially adjacent the lower end 40 of the scented decorative cover 36. The bloom portion 42 and/or the stem portion 44 of the floral grouping 34 may be exposed or may be contained within the scented decorative cover 36.

The scent 28 may be disposed on the upper surface 14 and/or the lower surface 16 of the sheet of polymeric material 10 such that the scent 28 may be provided on an outer or inner surface of the scented decorative cover 36, depending on the type of scent 28 used, the desired amount of scent 28 to be released by the decorative cover 36, and the desired application thereof. That is, it may be desired to place the scent 28 on the upper surface 14 of the sheet of polymeric material 10, and therefore an inner surface of the decorative cover 36, so that the scent 28 is in close approximation to the floral grouping 34, and so that none of the scent 28 will rub off on the hands of a person carrying the decorative cover 36 or on a transport or display container in which the decorative cover 36 is disposed. Alternatively, it may be desired to place the scent 28 on the lower surface 16 of the sheet of polymeric material 10, and therefore on an outer surface of the decorative cover 36, so that the scent 28 is not disposed within the decorative cover 36 but is exposed, thereby releasing more of the scent 28, and also so that detrimental interactions between the floral grouping 34 and the chemical components of the scent 28 are minimized.

In another embodiment, illustrated in FIG. 6, the scented sheet of polymeric material 10 having at least one surface thereof modified to provide the scented sheet of polymeric material 10 with an appearance and/or texture 12 simulating the appearance and/or texture of cloth (FIG. 2) is utilized to wrap the floral grouping 34 in a cylindrical fashion. The floral grouping 34 is disposed upon the scented sheet of polymeric material 10 approximately parallel to the third side 24 of the scented sheet of polymeric material 10. The scented sheet of polymeric material 10 is wrapped generally about the stem portion 44 of the floral grouping 34 to a position wherein the fourth side 26 of the scented sheet of polymeric material 10 generally overlaps the third side 24 of the scented sheet of polymeric material 10 in a cylindrical fashion. It should be noted that the scented sheet of polymeric material 10 may be wrapped a plurality of times about the stem portion 44 of the floral grouping 34 before the overlapping of the third side 24 and the fourth side 26 of the scented sheet of polymeric material 10. As before, the portion of the scented sheet of polymeric material 10 near the fourth side 26 is disposed generally adjacent another portion of the scented sheet of polymeric material 10, and the two adjacent-portions then are brought into contact where they may be bondingly engaged, thereby securing the scented sheet of polymeric material 10 generally about the floral grouping 34 so as to provide a scented decorative cover 36a for the floral grouping 34 which has the appearance of being fabricated of cloth.

Figure 7:
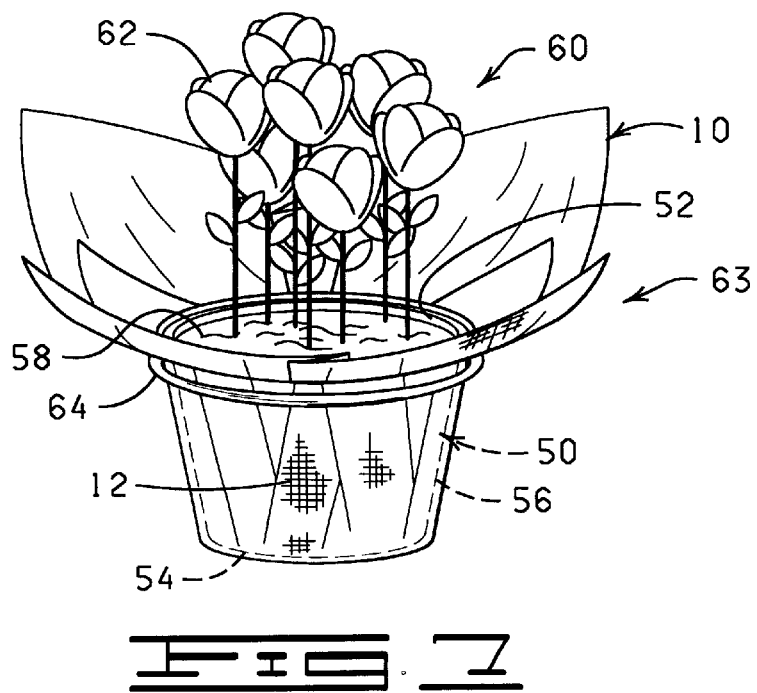
FIG. 7 is a perspective view of a scented decorative cover positioned about a flower pot wherein the scented decorative cover is formed from the scented sheet of polymeric material having a finish simulating the appearance of cloth on a surface thereof of FIG. 1.

In another version of the invention, the scented sheet of polymeric material 10 having at least one surface thereof modified so as to provide the scented sheet of polymeric material 10 with an appearance and/or texture 12 simulating the appearance and/or texture of cloth and containing the scent 28 may be used to wrap a flower pot or pot-type container, as noted above. Shown in FIG. 7 is a flower pot designated by the reference numeral 50 having an open upper end 52, a bottom end 54, an outer peripheral surface 56, and an inner retaining space 58 within which may be disposed a growing medium. The flower pot 50 may contain a botanical item, such as a plant 60, which has an upper portion 62 comprising blooms or foliage or both.

The scented sheet of polymeric material 10 having the appearance and/or texture 12 simulating the appearance and/or texture of cloth may be wrapped about the flower pot 50 by any one of numerous methods used to wrap sheets of material about flower pots to form decorative pot covers for flower pots, such as a scented decorative cover 63 having the appearance and/or texture 12 simulating the appearance and/or texture of cloth disposed about the flower pot 50 illustrated in FIG. 7. The scented sheet of polymeric material 10 may, for example, be formed by hand about the outer peripheral surface 56 of the flower pot 50 to produce the scented decorative cover 63 which has the appearance of being fabricated of cloth. The scented decorative cover 63 can then be secured about the flower pot 50 by a bonding material or by an elastic band 64 such that the open upper end 52 of the flower pot 50 remains substantially uncovered by the scented decorative cover 63, substantially as shown in FIG. 7.

Referring now to FIG. 8, a flower pot cover former and band applicator apparatus 66 for forming the scented sheet of polymeric material 10 having the appearance and/or texture 12 simulating the appearance and/or texture of cloth into the scented decorative cover 63 for the flower pot 50 of FIG. 7 is illustrated. The flower pot cover former and band applicator apparatus 66 comprises a band applicator 68 and a flower pot cover former 70. The flower pot cover former and band applicator apparatus 66 has a support platform 72 with an opening 74 formed therein. A band, such as elastic band 64, is disposed circumferentially about the opening 74 in the support platform 72.

The lower surface 16 of the scented sheet of polymeric material 10 (which has been modified to provide the scented sheet of polymeric material 10 with a textured or matted surface simulating cloth) is positioned on an upper surface 76 on the support platform 72 such that the scented sheet of polymeric material 10 is positioned over the opening 74 in the support platform 72. The is flower pot 50 is positioned above the scented sheet of polymeric material 10 and is moved in a direction 78 into the opening 74 of the flower pot cover former and band applicator apparatus 66. As the flower pot 50 is moved into the opening 74, the scented sheet of polymeric material 10 is pressed about the outer peripheral surface 56 of the flower pot 50, thereby forming the scented decorative cover 63 about the flower pot 50. The scented decorative cover 63 (which has an appearance and/or texture 12 simulating the appearance and/or texture of cloth) is then secured about the flower pot 50 by the elastic band 64. The flower pot 50 having the scented decorative cover 63 secured thereto is then moved in a direction 80 out of the opening 74 in the support platform 72.

The elastic band 64 can be applied manually or automatically, such as by the method shown in U.S. Pat. No. 5,105,599, entitled "MEANS FOR SECURING A DECORATIVE COVER ABOUT A FLOWER POT", issued to Weder on Apr. 21, 1992, which is hereby expressly incorporated herein by reference. The band 64 can also be applied as a tie using a method such as described in "Single Station Covering and Fastening System", U.S. Pat. No. 5,609,009, issued to Weder et al on Mar. 11, 1997, the specification of which is hereby expressly incorporated herein by reference. The scented sheet of polymeric material 10 having an appearance and/or texture 12 simulating the appearance and/or texture of cloth can also be applied automatically about the flower pot 50, for example, by methods shown in U.S. Pat. No. 4,733,521, entitled "COVER FORMING APPARATUS", issued to Weder et al. on Mar. 29, 1988, and U.S. Pat. No. 5,291,721, entitled "COVER FORMING APPARATUS HAVING PIVOTING FORMING MEMBERS", issued to Weder et al. on Mar. 8, 1994, both of which are hereby expressly incorporated herein by reference.

Instead of securing the scented decorative cover 63 about the flower pot 50 via the band 64, the scented decorative cover 63 formed from the scented sheet of polymeric material 10 having an appearance and/or texture 12 simulating the appearance and/or texture of cloth (FIG. 1) may be secured to the flower pot 50 by the use of one or more bonding materials. For example, the upper surface 14 of the scented sheet of polymeric material 10 may have a bonding material, such as the bonding material 27 (FIG. 2), disposed upon a portion thereof. When the scented sheet of polymeric material 10 is disposed about the flower pot 50, at least a portion of the upper surface 14 of the scented sheet of polymeric material 10 contacts the outer peripheral surface 56 of the flower pot 50 and is thereby bonded and held about the flower pot 50 via the bonding material.

The bonding material 27 may cover a portion of the upper surface 14 of the scented sheet of polymeric material 10, or the bonding material 27 may entirely cover the upper surface 14 of the scented sheet of polymeric material 10. The bonding material 27 may be disposed on the upper surface 14 of the scented sheet of polymeric material 10 in the form of a strip or in the form of spaced-apart spots. One method for disposing the bonding material 27 on the scented sheet of polymeric material 10 is described in U.S. Pat. No. 5,111,637, entitled "Method For Wrapping A Floral Grouping", issued to Weder et al. on May 12, 1992, which is expressly incorporated herein by reference.

The term "bonding material" when used herein can mean an adhesive, frequently a pressure sensitive adhesive, a cohesive, or any adhesive/cohesive combination having adhesive qualities (i.e., qualities of adhesion or adhesion/cohesion, respectively) sufficient to cause the attachment of a portion of the scented sheet of polymeric material 10 to itself, to a floral grouping 34, or to a flower pot 50. Since the bonding material 27 may comprise either an adhesive or an adhesive/cohesive combination, it will be appreciated that both adhesives and cohesives are known in the art, and both are commercially available. When the bonding material 27 is a cohesive, a similar cohesive material must be placed on the adjacent surface for bondingly contacting and bondingly engaging with the cohesive material.

The term "bonding material" also includes materials which are heat sealable and, in this instance, the adjacent portions of the material must be brought into contact and then heat must be applied to effect the seal. The term "bonding material" also includes materials which are sonically sealable and vibratory sealable. The term "bonding material" when used herein also includes a heat sealing lacquer or hot melt material which may be applied to the material and, in this instance, heat, sound waves, or vibrations, also must be applied to effect the sealing.

The term "bonding material" when used herein also refers to any type of material or thing which can be used to effect the bonding or connecting of the two adjacent portions of the scented sheet of polymeric material 10 to effect the connection or bonding described herein. The term "bonding material" may also include ties, labels, bands, ribbons, strings, tapes (including single or double-sided adhesive tapes), staples or combinations thereof. Some of the bonding materials would secure the ends of the material, while other bonding materials may bind the circumference of a cover or a sleeve, or, alternatively and/or in addition, the bonding materials would secure overlapping folds in the material and/or sleeve. Another way to secure the cover and/or sleeve is to heat seal the ends of the material to another portion of the material. One way to do this is to contact the ends with an iron of sufficient heat to heat seal the material.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

The term "bonding material" when used herein also includes any heat or chemically shrinkable material, and static electrical or other electrical materials, chemical welding materials, magnetic materials, mechanical or barb-type fastening materials or clamps, curl-type characteristics of the film or materials incorporated in material which can cause the material to take on certain shapes, cling films, slots, grooves, shrinkable materials and bands, curl materials, springs, and any type of welding method which may weld portions of the material to itself or to the pot, or to both the material itself and the pot.

Description of FIGS. 9–12

Figure 10:
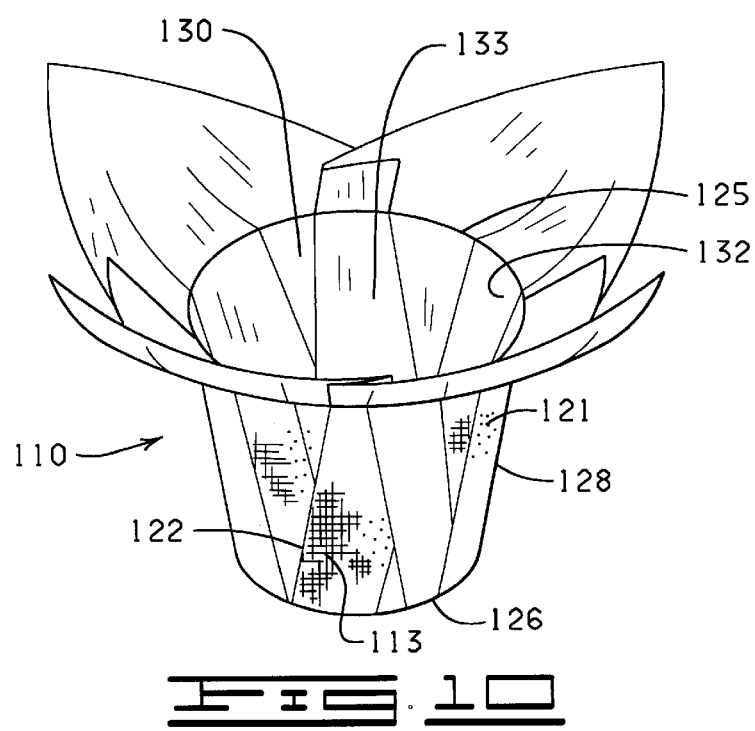
FIG. 10 is a perspective view of a scented preformed pot cover formed from a scented sheet of the polymeric material having a finish simulating the appearance of cloth on a surface thereof similar to the scented sheet of polymeric material of FIG. 1, the scented sheet of the expanded core polymeric film of FIG. 9A, or the scented sheet of laminated material of FIG. 9B.
Figure 11:
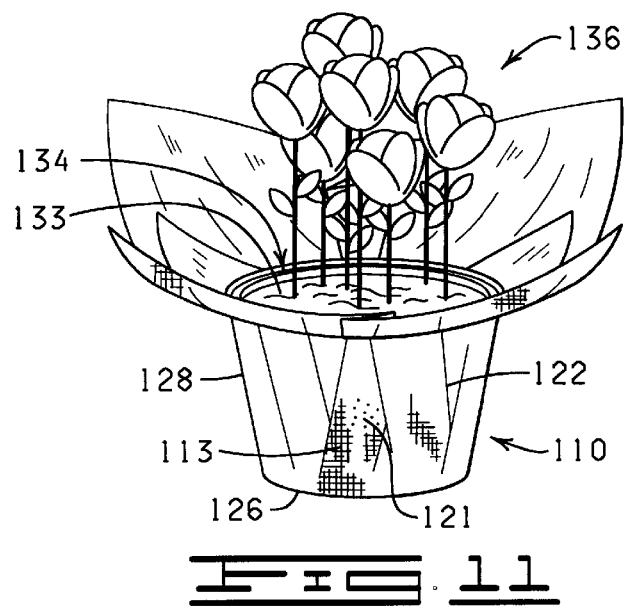
FIG. 11 is a perspective view of the scented preformed pot cover of FIG. 10 having a flower pot disposed therein.

Referring now to FIGS. 9A, 10 and 11, a decorative scented preformed flower pot cover 110 illustrated in FIGS. 10 and 11 is constructed from a scented sheet of flexible material 112 (FIG. 9A) having at least one surface thereof modified so as to provide the scented sheet of flexible material 112 with an appearance and/or texture 113 simulating the appearance and/or texture of cloth (FIG. 9A); however, it will be understood that the decorative scented preformed flower pot cover 110 may also be constructed from a scented sheet of flexible laminated material 112a having at least one surface thereof modified so as to provide the scented sheet of flexible laminated material 112a with an appearance and/or texture 113a simulating the appearance and/or texture of cloth (FIG. 9B). In the embodiment shown in FIG. 9A, the scented sheet of flexible material 112 used in the construction of the decorative scented preformed flower pot cover 110 comprises a sheet of expanded core polymeric film 114 having an upper surface 116, a lower surface 118 and a thickness in the range of from about 0.5 mil to about 10 mil, more desirably in the range of from about 0.6 mil to about 1.25 mil, and a coating of an acrylic heat sealable lacquer 120 disposed on at least one of the upper and lower surfaces 116 and 118 of the sheet of expanded core polymeric film 114. In FIG. 9A, the acrylic heat sealable lacquer 120 is depicted as being disposed on the lower surface 118 of the scented sheet of flexible material 112. It should be understood, however, that the scented sheet of flexible material 112 is not limited to being the expanded core polymeric film 114 having the appearance and/or texture 113 simulating the appearance and/or texture of cloth; rather, the scented sheet of flexible material 112 can be any flexible polymeric material (such as the scented sheet of polymeric material 10 herein before described) or flexible laminated material (such as will be described herein after with reference to FIG. 9B) which can be modified or textured so that at least one surface of such polymeric material or laminated material is provided with a finish or texture simulating cloth.

As previously stated, the modification of at least one surface of the sheet of expanded core polymeric film 114 to provide the scented sheet of flexible material 112 with the desired matte or textured finish 113 can be accomplished by printing a desired pattern on the sheet of expanded core polymeric film 114 and thereafter laminating a matte material, such as a translucent polymeric film, over the printed pattern. To further enhance the appearance and/or texture 113 simulating the appearance and/or texture of cloth, the matte material may or may not have a plurality of spatially disposed holes extending therethrough. A matte or textured finish simulating the appearance of cloth can also be produced by printing the sheet of expanded core polymeric film 114 with a matted (i.e. dull finish) ink, by lacquering at least one surface of the sheet of expanded core polymeric film 114 with a dull finish lacquer or a matting lacquer, by embossing the sheet of expanded core polymeric film 114 to provide an embossed pattern simulating the weave or texture of cloth, or by embossing and printing the sheet of expanded core polymeric film 114 to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable a providing the sheet of expanded core polymeric film 114 with an appearance and/or texture 113 simulating the appearance and/or texture of cloth can be achieved by extruding a polymeric resin onto a matted or textured chill roll to produce the sheet of expanded core polymeric film 114 or by laminating a second sheet of material to the sheet of expanded core polymeric film 114.

The sheet of flexible material 112 is further provided with a scent 121 on at least one of the upper and lower surfaces 116 and 118 thereof. The scent 121 is substantially identical to the scent 28 provided on the sheet of polymeric material 10 as described herein before with reference to FIG. 1, and the scent 121 may be disposed on the sheet of flexible material 112 by any method described herein or known in the art. The scent 121 may be applied prior to or following application of the texture and/or appearance 113 simulating the texture and/or appearance of cloth, or the scent 121 may be applied simultaneously with the texture and/or appearance 113 simulating the texture and/or appearance of cloth (i.e., the scent 121 may be incorporated into the ink, foamable ink, lacquer or foamable lacquer which is applied to provide the texture and/or appearance 113 simulating the texture and/or appearance of cloth), or the scent 121 may be incorporated into the resin prior to formation of the sheet of expanded core polymeric film 114. In a preferred embodiment, the scent may be disposed in the acrylic heat sealable lacquer 120 of the scented sheet of flexible material 112.

As shown in FIGS. 10 and 11, when the scented sheet of flexible material 112 is formed into the decorative scented preformed flower pot cover 110, a plurality of overlapping folds 122 are formed, and at least a portion of the overlapping folds 122 are connected to adjacently disposed portions of the scented preformed flower pot cover 110 via the acrylic heat sealable lacquer 120. The decorative scented preformed pot cover 110 so formed has an upper end 125, a lower end 126 and an outer peripheral surface 128. An opening 130 intersects the upper end 125, forming an inner peripheral surface 132 which defines and encompasses a retaining space 133 within which a flower pot 134 (FIG. 11) containing a floral grouping 136 may be disposed in a manner well known in the art. The scent 121 may be disposed on the outer peripheral surface 128 or the inner peripheral surface 132 of the scented decorative preformed flower pot cover 110, depending on the type of scent 121 used and the desired application thereof. It is to be understood that the scent 121 is depicted as being disposed on the outer peripheral surface 128 of the scented decorative preformed flower pot cover 110 for illustrative purposes only, and the invention is not limited to such embodiment.

In another embodiment, a scented sheet of flexible laminated material 112a (FIG. 9B) is used in the construction of the decorative scented preformed flower pot cover 110. The scented sheet of flexible laminated material 112a comprises a first sheet of material 114a having an upper surface 116a and a lower surface 118a, and a second sheet of material 120a. At least one surface of the first sheet of material 114a or the second sheet of material 120a is modified to provide the scented sheet of flexible laminated material 112a with the desired appearance and/or texture 113a simulating the appearance and/or texture of cloth. The scented sheet of flexible laminated material 112a having an appearance and/ or texture 113a simulating the appearance and/or texture of cloth can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of paper, metallized foil, polymeric film, or combinations or laminates thereof, such as a paper/polymeric film laminate, wherein at least one surface of the laminated material is textured or modified to assimilate the weave or texture of cloth.

The first sheet of material 114a desirably has a thickness in a range of from about 0.5 mil to about 10 mil, and more desirably from about 0.6 mil to about 1.25 mil, and the second sheet of material 120a desirably has a thickness in a range of from about 0.5 mil to about 10 mil, and more desirably from about 0.6 mil to about 1.25 mil. The second sheet or material 120a is desirably laminated to the first sheet of material 114a with a colored adhesive so as to impart a desired color to the scented sheet of flexible laminated material 112a. While the thickness of the scented sheet of flexible laminated material 112a can vary widely and will generally depend on the thickness of the first sheet of material 114a and the thickness of the second sheet of material 120a, desirable results can be obtained where the scented sheet of flexible laminated material 112a has a thickness in the range of from about 1 mil to about 20 mil, and more desirably from about 1.2 mil to about 2.5 mil.

The scented sheet of flexible laminated material 112a is further provided with a scent 121a disposed on at least a portion of one of the upper and lower surfaces 116a and 118a thereof, such as the upper surface 116a. The scent 121a is substantially identical to the scent 28 provided on the sheet of polymeric material 10 described herein before with reference to FIG. 1, and the scent 121a may be disposed on the scented sheet of flexible laminated material 112a be any method described herein or known in the art. The scent may be applied to either the first or second sheets of material 114a and 120a prior to lamination, or the scent 121a may be applied to the scented sheet of flexible laminated material 112a following lamination. In addition, the scent 121a may be applied prior to, simultaneously or following the application of the texture and/or appearance 113a simulating the texture and/or appearance of cloth.

As previously stated, the decorative scented preformed flower pot cover 110 may be constructed from the scented sheet of polymeric material 10 (FIG. 1), or the scented sheet of flexible material 112 (FIG. 9A), or the scented sheet of flexible laminated material 112a (FIG. 9B). The scented decorative preformed flower pot cover 110 so formed will have a plurality of overlapping folds 122 formed therein, at least a portion thereof being connected. If desired, the decorative scented preformed flower pot cover 110 can be formed of a plurality of sheets of the same and/or different types of material. The method and apparatus employed to form the decorative scented preformed flower pot cover 110 is substantially identical whether one uses one or more scented sheets of polymeric material 10 (FIG. 1), one or more scented sheets of flexible material 112 (FIG. 9A), or one or more scented sheets of flexible laminated material 112a (FIG. 9B) or a combination of such sheets of material. Thus, only the formation of the decorative scented preformed flower pot cover 110 using the scented sheet of flexible material 112 of FIG. 9A will be described in detail hereinafter.

Figure 12:
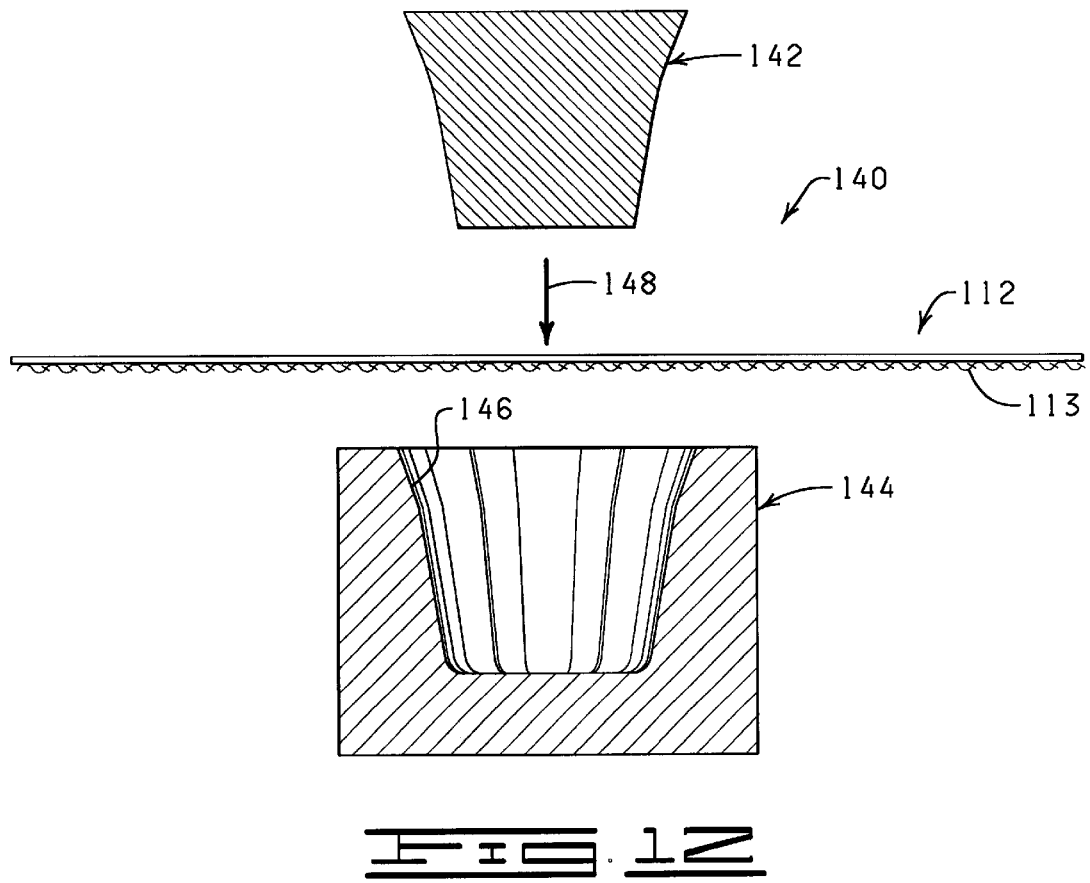
FIG. 12 is a diagrammatic, cross-sectional view of a male and female mold having the scented sheet of expanded core polymeric film of FIG. 9A disposed therebetween for forming the scented preformed pot cover of FIG. 10.

The decorative scented preformed flower pot cover 110 may be formed using a conventional mold system 140 comprising a male mold 142 and a female mold 144 having a mold cavity 146 for matingly receiving the male mold 142 (FIG. 12). The scented sheet of flexible material 112 having the texture and/or appearance 113 simulating the texture and/or appearance of cloth is positioned between the male and female molds 142 and 144, respectively. Movement of the male mold 142 in the direction 148 and into the mold cavity 146 forces the scented sheet of flexible material 112 to be disposed about the portion of the male mold 142 disposed in the mold cavity 146 of the female mold 146 and thereby forms the scented sheet of flexible material 112 into the scented preformed decorative flower pot cover 110 (FIGS. 10 and 11). Further, in accordance with the present invention, the decorative scented preformed flower pot cover 110 constructed from the materials described herein above may have a bonding material disposed upon a portion thereof.

Methods for forming such preformed decorative pot covers are well known in the art. Two methods of forming such covers are described in U.S. Pat. No. 4,773,182, entitled "ARTICLE FORMING SYSTEM", issued to Weder et al. on Sep. 27, 1988, and U.S. Pat. No. 5,291,721, entitled "COVER FORMING APPARATUS HAVING PIVOTING FORMING MEMBERS", issued to Weder et al. on Mar. 8, 1994, each of which is expressly incorporated herein by reference.

Description of FIGS. 13–19

Shown in FIGS. 13 and 14 is a scented decorative cover designated therein by the general reference numeral 160 which comprises a scented flexible bag or sleeve 162 of unitary construction having an appearance and/or texture 163 simulating the appearance and/or texture of cloth in accordance with the present invention. The scented sleeve 162 initially comprises a flexible flat collapsed piece of material which is openable in the form of a tube or sleeve. Such sleeves are well known in the floral industry. Further, in accordance with the present invention, the scented decorative cover 160 can be constructed of the scented polymeric material 10 (FIG. 1), the scented flexible material 112 (FIG. 9A), or the scented flexible laminated material 112a (FIG. 9B), whereby at least a portion of one surface, preferably an outer peripheral surface 164 of the scented sleeve 162, has been modified to provide the scented sleeve 162 with the appearance and/or texture 163 simulating the appearance and/or texture of cloth as previously described herein.

The scented sleeve 162 has an upper end 166, a lower end 168 and the outer peripheral surface 164. The scented sleeve 162 may be tapered outwardly from the lower end 168.toward a larger diameter at its upper end 166. In its flattened state the scented sleeve 162 generally has an overall trapezoidal or modified trapezoidal shape, and when opened is substantially frusto-conical to coniform in configuration. It will be appreciated, however, that the scented sleeve 162 may comprise variations on the aforementioned shapes or may comprise significantly altered shapes such as square or rectangular, wherein the scented sleeve 162 when opened has a cylindrical form, as long as the scented sleeve 162 functions in accordance with the present invention in the manner described herein. The scented sleeve 162 (or any other sleeve disclosed herein) may have an angular or contoured shape.

The scented sleeve 162 has an opening 170 at the upper end 166 and may be open at the lower end 168, or closed with a bottom at the lower end 168. The scented sleeve 162 also has an inner peripheral surface 172 which, when the scented sleeve 162 is opened, defines and encompasses an inner retaining space 174. When the lower end 168 of the scented sleeve 162 has a closed lower end 168, a portion of the lower end 168 may be inwardly folded to form one or more gussets (not shown) for allowing the lower portion of the inner retaining space 174 to be expandable, for example, for receiving the circular bottom of a flower pot or growing medium.

The scented sleeve 162 is generally frusto-conically shaped, but the scented sleeve 162 may be, by way of example but not by way of limitation, cylindrical, frusto-conical, a combination of both frusto-conical and cylindrical, or any other shape, as long as the scented sleeve 162 functions as described herein as noted above. Further, the scented sleeve 162 may comprise any shape, whether geometric, non-geometric, asymmetrical and/or fanciful as long as it functions in accordance with the present invention. The scented sleeve 162 may also be equipped with drain holes (if having a closed bottom) or side ventilation holes (not shown), or can be made from gas permeable or impermeable materials.

The material from which the scented sleeve 162 is constructed is the same as previously described above for the scented sheet of polymeric material 10 having at least one surface thereof modified so as to provide the scented sheet of polymeric material 10 with an appearance and/or texture 12 simulating the appearance and/or texture of cloth, the scented sheet of flexible material 112 or the scented sheet of flexible laminated material 112a. Any thickness of material may be utilized in accordance with the present invention as long as the scented sleeve 162 may be formed as described herein, is provided with the appearance and/or texture 163 simulating the appearance and/or texture of cloth, and as long as the formed scented sleeve 162 may contain at least a portion of a flower pot or a floral grouping,-as described herein. Additionally, an insulating material such as bubble film, preferable as one of two or more layers, can be utilized in order to provide additional protection for the item, such as a floral grouping, contained therein.

The sleeve 162 is provided with a scent 175 disposed on at least a portion of one of the outer peripheral surface 164 and inner peripheral surface 172 thereof. The scent 175 is substantially identical to the scent 28 provided on the sheet of polymeric material 10 as described herein before with reference to FIG. 1, and the scent 175 may be disposed on the sleeve 162 by any method described herein or known in the art. The scent 175 may be applied prior to or following the texture and/or appearance 163 simulating the texture and/or appearance of cloth, or simultaneously with the texture and/or appearance 163 simulating the texture and/or appearance of cloth. While the scent 175 is shown as being disposed on the outer peripheral surface 164 of the sleeve 162, it should be understood that the scent 175 may be disposed on the inner peripheral surface 172 of the sleeve 162 or on both the outer and inner peripheral surface 164 and 172 of the sleeve 162, depending on the type of scent 175 used and the desired application of the sleeve 162.

In FIG. 13 the scented sleeve 162 is illustrated having the appearance and/or texture 163 simulating the appearance and/or texture of cloth provided on the outer peripheral surface 164 of the scented sleeve 162. In FIG. 14, a floral grouping 176 is illustrated as being disposed within the inner retaining space 174 of the scented sleeve 162. Generally, an upper or bloom portion 178 of the floral grouping 176 is positioned substantially adjacent the opening 170 of the scented sleeve 162 and a lower or stem portion 180 of the floral grouping 176 is positioned substantially adjacent the lower end 168 of the scented sleeve 162. Either the upper end 166 or the lower end 168 of the scented sleeve 162 may be closed about the floral grouping 176. Generally, a portion of the scented sleeve 162 is tightened about a portion of the stem portion 180 of the floral grouping 176 for holding the scented decorative cover 160 about the floral grouping 176. For example, the scented sleeve 162 may be held by a tie 182 tied about the scented sleeve 162, such as is shown in FIG. 14. Other methods for binding the scented sleeve 162 may be employed, such as the bonding methods and materials described elsewhere herein. For example, as shown in FIGS. 15 and 16, a scented decorative cover 160a is shown which comprises a scented sleeve 162a having an appearance and/or texture 163a simulating the appearance and/or texture of cloth and a cinching tab 184 having a bonding material 186 disposed upon a surface thereof. The cinching tab 184 can be used to gather portions of the scented sleeve 162ato-gether about the stem portion 180 of the floral grouping 176 as shown in FIG. 16 for holding the scented sleeve 162a tightly about the floral grouping 176.

Referring again to FIGS. 13 and 14, it may generally be desired to use the scented sleeve 162 as a scented decorative cover for a flower pot, as will be discussed in further detail below. The flower pot will generally contain a botanical item or plant. The flower pot can be deposited into the open scented sleeve 162 in a manner well known in the art, such as manually wherein the scented sleeve 162 is opened by hand and the flower pot deposited therein.

As noted above, a bonding material may be disposed on a portion of the scented sleeve 162 or any sleeve described herein to assist in holding the scented sleeve 162 to the flower pot when the flower pot is disposed within the scented sleeve 162 or to assist in closing the upper end 166 of the scented sleeve 162 or adhering the scented sleeve 162 to the flower pot after the flower pot has been disposed therein, as will be discussed in further detail below.

It will be understood that the bonding material, if present, may be disposed as a strip or block on a surface of the scented sleeve 162. The bonding material may also be disposed upon either the outer peripheral surface 164 or the inner peripheral surface 172 of the scented sleeve 162, as well as upon the flower pot. Further, the bonding material may be disposed as spots of bonding material, or in any other geometric, non-geometric, asymmetric, or fanciful form, and in any pattern, including covering either the entire inner peripheral surface 172 and/or outer peripheral surface 164 of the scented sleeve 162 and/or the flower pot. The bonding material may be covered by a cover or release strip which can be removed prior to the use of the scented sleeve 162 or flower pot. The bonding material can be applied by methods known to those of ordinary skill in their art. One method for disposing a bonding material, in this case an adhesive, is described in U.S. Pat. No. 5,111,637, entitled "METHOD FOR WRAPPING A FLORAL GROUPING", issued to Weder et al. on May 12, 1993, the specification of which is hereby expressly incorporated herein by reference.

As noted above, a bonding material may be disposed on at least a portion of the inner peripheral surface 172 of the scented sleeve 162 (or any other sleeve described herein), or, alternatively, the bonding material may be disposed on an outer peripheral surface of a flower pot contained within the scented sleeve 162, while the scented sleeve 162 may be free of the bonding material. In a further alternative, the bonding material may be disposed both on at least a portion of a flower pot as well as upon at least a portion of the inner peripheral surface 172 of the scented sleeve 162. In addition, a portion of the bonding material may also be disposed on the outer peripheral surface 164 of the scented sleeve 162 as well. It will be understood that the bonding material may be disposed in a solid section of bonding material. The bonding material, when present, is disposed on the scented sleeve 162 and/or flower pot by any method known in the art.

Certain versions of sleeves described herein may be used in combination with a preformed pot cover. For example, a preformed pot cover may be applied to the pot, then the covered pot wrapped or disposed within a sleeve. Either the cover or the sleeve, or both, may have an appearance and/or texture simulating the appearance and/or texture of cloth. Examples of sleeves which may be used in this invention are shown in the specification of U.S. Pat. No. 5,625,979, entitled "SLEEVE HAVING A DETACHABLE PORTION FORMING A SKIRT AND METHODS", issued to Weder on May 6, 1997, which is expressly incorporated herein by reference in its entirety. Equipment and devices for forming sleeves are commercially available, and well known in the art.

Figure 17:
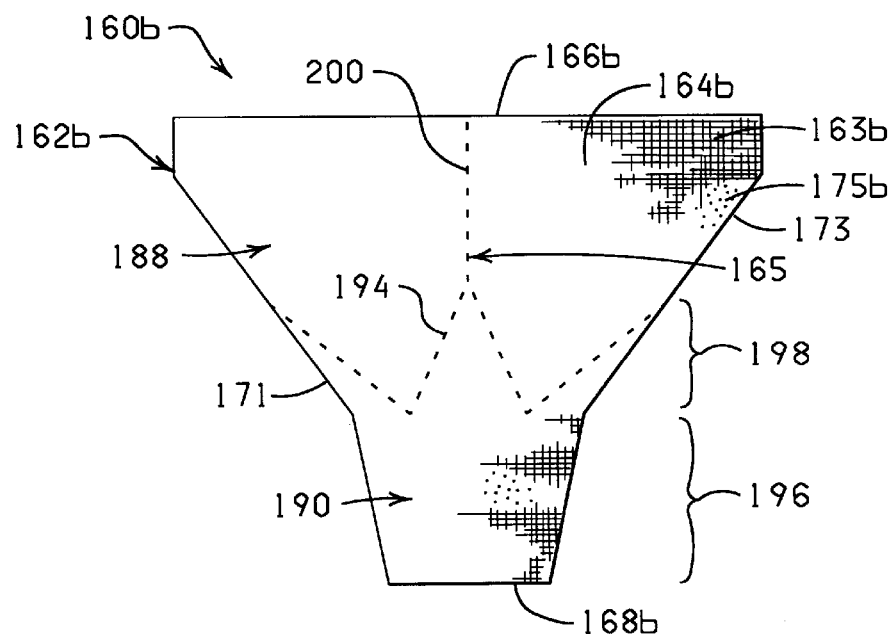
FIG. 17 is an elevational view of a scented sleeve having a detachable portion wherein the scented sleeve is formed from a scented sheet of polymeric material having a finish simulating the appearance of cloth on a surface thereof.
Figure 18:
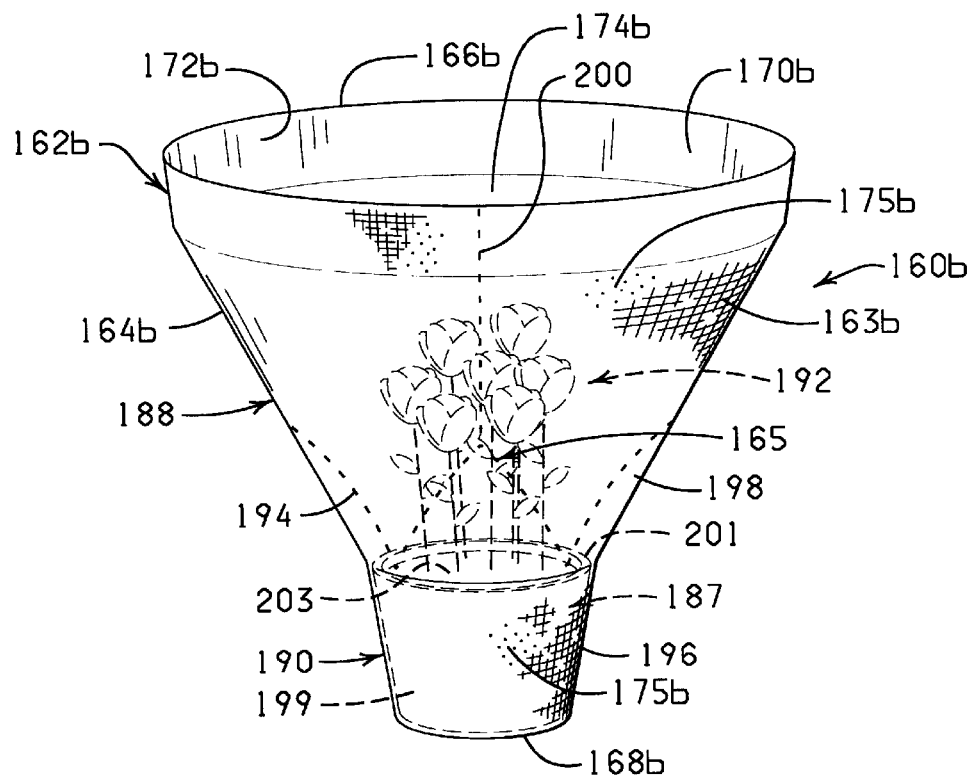
FIG. 18 is a perspective view of the scented sleeve of FIG. 17 having a flower pot disposed therein.

Shown in FIGS. 17 and 18 is another embodiment of a scented decorative cover 160b comprising a scented sleeve 162b having an appearance and/or texture 163b simulating the appearance and/or texture of cloth constructed from the scented polymeric material 10, or the scented flexible material 112 or the scented flexible laminated material 112a in accordance with the present invention. The scented sleeve 162b has a "detaching" element 165 in predetermined areas for detaching a portion of the scented sleeve 162b. The scented sleeve 162b generally initially comprises a flexible flat collapsed piece of material which is openable in the form of a tube or sleeve. The scented sleeve 162b is constructed of the same material and in the same way as described previously herein and may be described exactly the same as the other sleeves described herein except for the additional elements described hereinafter.

The scented sleeve 162b has an upper end 166b, a lower end 168b, and an outer peripheral surface 164b. The scented sleeve 162b has an opening 170b at the upper end 166b thereof, and the scented sleeve 162b may be open at the lower end 168b or closed with a bottom at the lower end 168b. In a flattened state (FIG. 17), the scented sleeve 162b has a first side 171 and a second side 173. The scented sleeve 162b also has an inner peripheral surface 172b which, when the scented sleeve 162b is opened, defines and encompasses an inner retaining space 174b as shown in FIG. 18. When the lower end 168b of the scented sleeve 162b has a closed bottom, a portion of the lower end 168b may be inwardly folded to form one or more gussets (not shown) for permitting a circular bottom of an object such as a flower pot 187 to be disposed in the inner retaining space 174b of the scented sleeve 162b.

As shown in FIGS. 17 and 18, the scented sleeve 162b is demarcated into an upper portion 188 and a lower portion 190. The lower portion 190 of the scented sleeve 162b is generally sized to contain the flower pot 187. The upper portion 188 of the scented sleeve 162b is sized to substantially surround and encompass a plant 192 contained in the flower pot 187 disposed within the lower portion 190 of the scented sleeve 162b. The scented sleeve 162b is demarcated into the upper portion 188 and the lower portion 190 by the detaching element 165 for enabling the detachment of the upper portion 188 of the scented sleeve 162b from the lower portion 190 of the scented sleeve 162b. In the present version, the detaching element 165 includes a plurality of generally laterally-oriented or alternating diagonally-oriented perforations 194 which extend circumferentially across the outer peripheral surface 164b of the scented sleeve 162b.

In the embodiment shown in FIGS. 17 and 18, the lower portion 190 of the scented sleeve 162b further comprises a base portion 196 and a skirt portion 198. The base portion 196 of the lower portion 190 of the sleeve 162b comprises that part of the lower portion 190 which, when the flower pot 176bis placed into the lower portion 190, is substantially adjacent to and surrounds an outer peripheral surface 199 of the flower pot 187. The skirt portion 198 of the lower portion 190 of the scented sleeve 162b comprises that part of the lower portion 190 which extends beyond an open upper end 201 of the flower pot 187 and surrounds at least a portion of the plant 192 contained within the flower pot 187 and which is left to freely extend at an angle, inwardly or outwardly, from the base portion 196 when the upper portion 188 of the scented sleeve 162b is detached from the lower portion 190 of the scented sleeve 162b by actuation of the detaching element 165.

In the intact scented sleeve 162b, the skirt portion 198 has an upper peripheral edge congruent with the detaching element 165 which is connected to a lower peripheral edge, also congruent with the detaching element 165, of the upper portion 188 of the scented sleeve 162b. In FIGS. 17 and 18, the upper peripheral edge of the skirt portion 198 is congruent with the series of alternating diagonally-oriented lines of perforations 194 which together form a zig-zag and comprise a portion of the detaching element 165. The detaching element 165 may further comprise a plurality of vertical perforations 200 disposed in the upper portion 188 of the sleeve 162b for facilitating removal of the upper portion 188 from the lower portion 190 of the scented sleeve 162*b* and which are disposed more or less vertically therein extending between the alternating diagonally oriented lines of perforations 194 of the detaching element 165 and the upper end 166*b* of the scented sleeve 162*b*.

Figure 19:
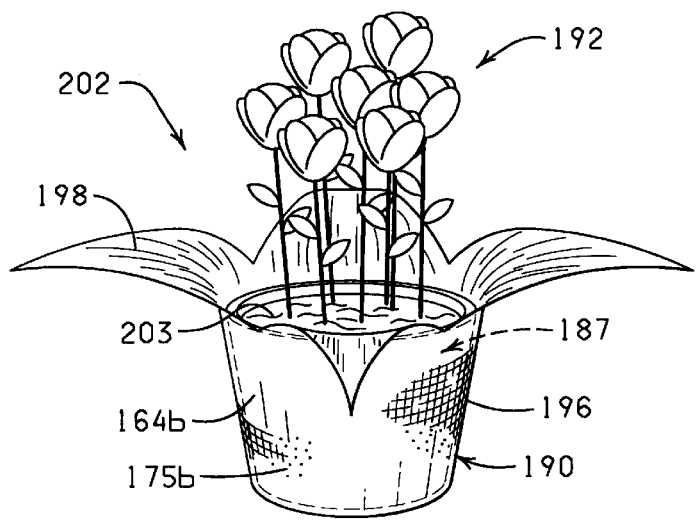
FIG. 19 is a perspective view of a flower pot disposed in the scented sleeve of FIG. 17 wherein an upper portion of the sleeve has been removed to provide a scented decorative cover having a skirt.

Referring now to FIGS. 18 and 19, the upper portion 188 of the scented sleeve 162*b* is thereby separable from the lower portion 190 of the scented sleeve 162*b* by tearing the upper portion 188 along both the perforations 194 and 200 of the detaching element 165, thereby separating the upper portion 188 from the lower portion 190 of the scented sleeve 162*b*. The lower portion 190 of the scented sleeve 162*b* remains disposed as the base portion 196 about the flower pot 187 and as the skirt portion 198 about the plant 192, thereby forming a scented decorative cover 202 as shown in FIG. 19 which substantially surrounds and encompasses the flower pot 187 and the plant 192 contained therein.

The lower portion 190 of the scented sleeve 162*b*, for example, the base and skirt portions 196 and 198, may be modified to provide the lower portion 190 of the scented sleeve 162*b* with the appearance and/or texture 163*b* simulating the appearance and/or texture of cloth, while the upper portion 188 is left unmodified or is. printed with a design. When the upper portion 188 is detached, the lower portion 190 of the scented sleeve 162*b* remains about the flower pot 176*b* and thereby forms a scented decorative cover 202 about the flower pot 176*b* which has the appearance of a decorative cloth cover.

"Detaching element" as used herein, refers to any element, or combination of elements, or features, such as, but not by way of limitation, perforations, tear strips, zippers, and any other devices or elements of this nature known in the art, or any combination thereof. Therefore, while perforations are shown and described in detail herein, it will be understood that tear strips, zippers, or any other "detaching elements" known in the art, or any combination thereof, could be substituted therefor and/or used therewith.

The sleeve 162*b* is provided with a scent 175*b* disposed on at least a portion of one of the outer peripheral surface 164*b* and inner peripheral surface 172*b* thereof. The scent 175*b* is substantially identical to the scent 28 provided on the sheet of polymeric material 10 as described herein before with reference to FIG. 1, and the scent 175*b* may be disposed on the sleeve 162*b* by any method described herein or known in the art. The scent 175*b* may be applied prior to or following the texture and/or appearance 163*b* simulating the texture and/or appearance of cloth, or simultaneously with the texture and/or appearance 163*b* simulating the texture and/or appearance of cloth. Optionally, the scent 175 may be incorporated in the resin from which the sleeve 162*b* is formed. The scent 175*b* may be disposed on the outer peripheral surface 164*b* or inner peripheral surface 172*b* of the sleeve 162*b* depending on the type of scent 175*b* used and the desired application of the sleeve 162*b*. It is to be understood that the scent 175*b* is depicted as being disposed on the outer peripheral surface 164*b* of the sleeve 162*b* for illustrative purposes only, and the invention is not limited to-such embodiment. The scent 175*b* may be applied to the lower portion 190 or the upper portion 188 of the sleeve 162*b*, depending on the type of scent 175*b* used and the desired application of the sleeve 162*b*. That is, it may be desired to have the scent 175*b* disposed on the lower portion 190 in such a manner that the scent 175*b* becomes more fragrant upon detachment of the upper portion 188. Alternatively, it may be desired to dispose the scent 175*b* only on the upper portion 188 so that the scent 175*b* may be removed upon detachment of the upper portion 188 of the sleeve 162*b*, if desired by a consumer. In addition, when the scent 175*b* is provided on the lower portion 190 of the sleeve 162*b*, the scent 175*b* may only be disposed on a portion of the lower portion 190, such as the base portion 196 or the skirt portion 198 thereof, or the scent 175*b* may be disposed on the entire lower portion 190 of the sleeve 162*b*.

In a general method of use of the scented sleeve 162*b* as the scented decorative cover 202 for the flower pot 187, an operator provides the scented sleeve 162*b* and the flower pot 187 having the plant 192 disposed in a growing medium contained within the flower pot 176*b*. The operator then opens the scented sleeve 162*b* at its upper end 166*b* and assures both that the opening 170*b* therein is in an open condition and that the inner peripheral surface 172*b* of the scented sleeve 162*b* is somewhat expanded outward as well, as shown in FIG. 18. The operator then manually or automatically disposes the flower pot 187 into the opening 170*b* in the scented sleeve 162*b*, the flower pot 187 being disposed generally through the upper portion 188 of the scented sleeve 162*b* into generally the lower portion 190 of the scented sleeve 162*b*. The flower pot 187 remains in the lower portion 190 of the scented sleeve 162*b*, permitting the scented sleeve 162*b* to substantially surround and tightly encompass the flower pot 187. It will be understood that alternatively, the scented sleeve 162*b* may be provided with an extension (not shown) and the scented sleeve 162*b* may be disposed on rods or wickets, and the flower pot 187 may be disposed in the scented sleeve 162*b* either before or after the scented sleeve 162*b* has been removed from the wickets. Additionally, the upper portion 188 of the scented sleeve 162*b* may be removed from the lower portion 190 of the scented sleeve 162*b* to form the scented decorative cover 202 as hereinbefore discussed.

Embodiments of FIGS. 20A–20C

Referring now to FIG. 20A, designated generally by the reference numeral 210 is a scented polymeric ribbon material having at least one surface thereof modified so as to provide the scented polymeric ribbon material 210 with an appearance and/or texture 212 simulating the appearance and/or texture of cloth for forming decorative bows and for wrapping items. That is, at least one surface of a web of polymeric material (not shown) is modified to provide a matte or textured finish which provides the appearance and/or texture 212 simulating the appearance of cloth. The modification of the web of polymeric material (not shown) to provide the scented polymeric ribbon material 210 with a matte or textured finish which provides the texture and/or appearance 212 simulating the texture and/or appearance of cloth can be accomplished in several ways. For example, the scented polymeric ribbon material 210 having the matte or textured finish which provides the texture and/or appearance 212 simulating the texture and/or appearance of cloth can be produced by printing a web of polymeric material with a matted (i.e. dull finish) ink, by lacquering at least one surface of the sheet of polymeric material with a dull finish lacquer or a matting lacquer, by embossing the sheet of polymeric material to provide an embossed pattern simulating the weave or texture of cloth, or by flocking the sheet of polymeric material, or by application of a foamable lacquer or foamable ink to the sheet of polymeric material, or by embossing and printing the sheet of polymeric material to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable of providing the sheet of polymeric material with the appearance and/or texture 212 simulating the appearance and/or texture of cloth can be achieved by extruding a polymeric resin onto a matted or textured chill roll. Thereafter, the web of material having an appearance and/or texture simulating the appearance and/or texture of cloth can be cut in a conventional manner to provide the scented polymeric ribbon material 210 having the appearance and/or texture 212 simulating the appearance and/or texture of cloth.

The polymeric ribbon material 210 is provided with a scent 214 disposed on at least a portion of one surface thereof. The scent 214 is substantially identical to the scent 28 provided on the sheet of polymeric material 10 as described herein before with reference to FIG. 1, and the scent 214 may be disposed on the polymeric ribbon material 210 by any method described herein or known in the art. The scent 214 may be disposed on the sheet of polymeric material from which the scented polymeric ribbon material 210 is produced, or may be incorporated in the resin from which the sheet of polymeric material is formed, or may be disposed directly on the scented polymeric ribbon material 210.

Any polymeric material capable of being textured or otherwise modified to provide the polymeric material with the appearance and/or texture 212 simulating the appearance and/or texture of cloth can be employed in the formulation of the scented polymeric ribbon material 210. For example, the polymeric material employed to produce the scented polymeric ribbon material 210 can be the polymeric material 10 (FIG. 1), i.e. a polypropylene film having a thickness in a range of from about 0.1 mil to about 30 mil, and more desirably of from about 0.5 mil to about 10 mil, or the scented sheet of flexible material 112, i.e., an expanded core polymeric film having a thickness in a range of from about 0.5 mil to about 10 mil.

Referring now to FIG. 20B, designated generally by the reference numeral 220 is another embodiment of a scented polymeric ribbon material for forming decorative bows and for wrapping items. The scented polymeric ribbon material 220 is a laminated material comprising a first web or sheet of material 222 having a thickness of from about 0.5 mil to about 10 mil, and more desirably from about 0.6 mil to about 1.25 mil, and a second web or sheet of material 224 having a thickness in a range of from about 0.5 mil to about 10 mil, and more desirably from about 0.6 mil to about 1.25 mil. The laminated material has an appearance and/or texture 226 simulating the appearance and/or texture of cloth and can be produced by laminating two or more sheets of polymeric film (such as two or more sheets of polypropylene film or a sheet of polypropylene film and a sheet of expanded core polymeric film, such as expanded core polypropylene film), or by laminating a polymeric film (such as polypropylene film or an expanded core polymeric film) with a sheet of paper, metallized foil and the like wherein at least one surface of the laminated material is textured or modified to assimilate the weave or texture of cloth. The second web or sheet of material 224 is desirably laminated to the first web or sheet of material 222 with a colored adhesive so as to impart a desired color to the scented polymeric ribbon material 220. If desired the scented polymeric ribbon material 220 may be treated or otherwise processed to provide the scented polymeric ribbon material 220 with a matte or textured finish which provides the texture and/or appearance 226 simulating the weave or knit of cloth so that the scented polymeric ribbon material 220 has a cloth like appearance similar to the scented polymeric ribbon material 210 hereinbefore described with reference to FIG. 20A. That is, a matte or textured finish which provides the texture and/or appearance 226 simulating the texture and/or appearance of cloth can be printed on the first web or sheet of material 222, and thereafter the second web or sheet of material 224 (which in this case is desirably a matte material of translucent polymeric film) is laminated to the first web or sheet of material 222 to provide the scented polymeric ribbon material 220 with the appearance and/or texture 226 simulating the appearance and/or texture of cloth. To further enhance the appearance and/or texture 226 simulating the appearance and/or texture of cloth of the scented polymeric ribbon material 220, the second web or sheet of material 224 may or may not have a plurality of spatially disposed holes extending therethrough. The matte or textured finish can be produced by printing at least one of the first and second webs or sheets of material 222 and 224 with a matted (i.e. dull finish) ink, by lacquering at least one surface of at least one of the first and second webs or sheets of material 222 and 224 with a dull finish lacquer or a matting lacquer, by flocking at least one of the first and second webs or sheets of material 222 and 224, by application of a foamable lacquer or foamable ink to at least one of the first and second webs or sheets of material 222 and 224, by embossing at least one of the first and second webs or sheets of material 222 and 224 to provide an embossed pattern simulating the weave or texture of cloth, or by embossing and printing at least one of the first and second webs or sheets of material 222 and 224 to provide embossed and printed patterns wherein the embossed and printed patterns may be in registry, out of registry, or wherein a portion of the embossed and printed patterns are in registry and a portion of the embossed and printed patterns are out of registry. In addition, a matte or textured finish capable of providing the scented polymeric ribbon material 220 with the appearance and/or texture 226 simulating the appearance and/or texture of cloth can be achieved by extruding the resin used to produce one of the first and second webs or sheets of material 222 and 224 onto a matted or textured chill roll.

The polymeric ribbon material 220 is provided with a scent 228 disposed on at least a portion of one surface thereof. The scent 228 is substantially identical to the scent 28 provided on the sheet of polymeric material 10 as described herein before with reference to FIG. 1, and the scent 228 may be disposed on the polymeric ribbon material 220 by any method described herein or known in the art. The scent 228 may be incorporated in the resin from which the first or second sheet or web of material 222 or 224 is formed, or may be disposed on the first or second sheet or web of polymeric material 222 or 224 prior to lamination, or may be disposed on the laminated material from which the polymeric ribbon material 220 is produced, or may be disposed directly on the polymeric ribbon material 220.

Referring now to FIG. 20C, designated generally by the reference numeral 230 is another embodiment of a scented polymeric ribbon material for forming decorative bows and for wrapping items. The scented polymeric ribbon material 230 comprises a polymeric film 232 having an upper. surface 234, a lower surface 236 and a thickness in the range of from about 0.1 mil to about 30 mil, and more desirably, from about 0.5 mil to about 10 mil. An acrylic heat sealable lacquer 238 is applied to at least one of the upper and lower surfaces 234 and 236 of the polymeric film 232, such as the lower surface 236 of the polymeric film 232, and at least one of the upper surface 234 and the lower surface 236 of the polymeric film 232 and/or the acrylic heat sealable lacquer 238 is desirably modified to provide the scented polymeric ribbon material 230 with a matte or textured finish which provides the polymeric ribbon material 230 with the texture and/or appearance 239 simulating the appearance of cloth. The modification to provide the scented polymeric ribbon material 230 with the appearance and/or texture 239 simulating the appearance and/or texture of cloth can be accomplished in several ways. For example, the scented polymeric ribbon material 230 having the matte or textured finish can be produced by printing a web of polymeric material with a matted (i.e. dull finish) ink, by lacquering at least one of the upper surface 234 or the lower surface 236 of the polymeric film 232 with a dull finish lacquer or a matting lacquer 238, by flocking the polymeric film 232 and/or the acrylic heat sealable lacquer 238, by application of a foamable lacquer or foamable ink to the polymeric film 232 and/or the acrylic heat sealable lacquer 238, by embossing the polymeric film 232 and/or the acrylic heat sealable lacquer 238 to provide an embossed pattern simulating the weave or texture of cloth, or by embossing and printing the polymeric film 232 and/or the acrylic heat sealable lacquer 238 to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish capable of providing the polymeric ribbon material 230 with the appearance and/or texture 239 simulating the appearance and/or texture of cloth can be achieved by extruding a polymeric resin onto a matted or textured chill roll. Thereafter, the polymeric film 232 having the acrylic heat sealable lacquer 238 disposed thereon and the appearance and/or texture 239 simulating the appearance and/or texture of cloth can be cut in a conventional manner to provide the scented polymeric ribbon material 230 having the texture and/or appearance 239 simulating the texture and/or appearance of cloth.

The polymeric ribbon material 230 is provided with a scent 240 disposed on at least a portion of one surface thereof. The scent 240 is substantially identical to the scent 28 provided on the sheet of polymeric material 10 as described herein before with reference to FIG. 1, and the scent 240 may be disposed on the polymeric ribbon material 230 by any method described herein or known in the art. The scent 240 may be applied to or incorporated in the polymeric film 232, incorporated in the acrylic heat sealable lacquer 238, or applied directly to the polymeric ribbon material 230.

Any polymeric film capable of being textured or otherwise modified to provide the polymeric material with the appearance and/or texture 239 simulating the appearance and/or texture of cloth can be employed in the formulation of the scented polymeric ribbon material 230. For example, the polymeric film 232 employed to produce the scented polymeric ribbon material 230 can be polypropylene film having a thickness in a range of from about 0.1 mil to about 30 mil, and more desirably in a range of from about 0.5 mil to about 10 mil, or an expanded core polymeric film having a thickness in a range of from about 0.6 mil to about 10 mil.

Embodiments of FIGS. 21–22B

Referring now to FIG. 21, designated generally by the reference numeral 241 is a system for producing scented decorative grass 242 having an appearance and/or texture 246 (FIG. 22A) simulating the appearance and/or texture of cloth in accordance with the present invention. That is, at least one surface of a sheet or web of polymeric material is modified with a matte or textured finish to provide a web of polymeric material 244 having an appearance and/or texture simulating the appearance and/or texture of cloth (i.e. assimilates cloth in appearance) as hereinbefore described. Thus, the scented decorative grass 242 produced from the web of polymeric material 244 will also have a matte or textured finish which provides the scented decorative grass 242 with the appearance and/or texture 246 simulating the appearance and/or texture of cloth.

Any polymeric material capable of being textured or otherwise modified to provide the web of polymeric material 244 with an appearance and/or texture simulating the appearance and/or texture of cloth can be employed to produce the scented decorative grass 242 having an appearance and/or texture simulating the appearance and/or texture of cloth including the scented sheet of polymeric material 10 (FIG. 1), the scented sheet of flexible material 112 (FIG. 9A), or the scented sheet of flexible laminated material 112a (FIG. 9B). For example, the polymeric material employed to produce the web of polymeric material 244 having an appearance and/or texture simulating the appearance and/or texture of cloth can be polypropylene film having a thickness in a range of from about 0.1 mil to about 30 mil, and more desirably of from about 0.5 mil to about 10 mil, or an expanded core polymeric film having a thickness of from about 0.5 mil to about 10 mil, or laminates having a thickness of from about 1 mil to about 20 mil. The laminates which can be used to produce the web of polymeric material 244 having an appearance and/or texture simulating the appearance and/or texture of cloth can be formed by laminating two or more webs of polymeric film (such as two or more webs of polypropylene film or a web of polypropylene film and a web of expanded core polymeric film, such as expanded core polypropylene film), or by laminating a polymeric film (such as polypropylene film or an expanded core polymeric film such as expanded core polypropylene film) with paper, metallized foil and the like. The only requirement in using a laminate to produce the web of polymeric material 244 having an appearance and/or texture simulating the appearance and/or texture of cloth is that at least one surface of the laminate be capable of being modified to provide the laminate with at least one surface having an appearance and/or texture simulating the appearance and/or texture of cloth.

The modification of the web of polymeric material 244 to provide the matte or textured finish can be accomplished in several ways. For example, the web of polymeric material 244 having the matte or textured finish which provides the web of polymeric material 244 with the appearance and/or texture simulating the appearance and/or texture of cloth can be produced by printing a web of polymeric material with a matted (i.e. dull finish) ink, by lacquering at least one surface of the web of polymeric material with a dull finish lacquer or a matting lacquer, by embossing the web of polymeric material to provide an embossed pattern simulating the weave or texture of cloth, or by flocking the web of polymeric material, or by application of a foamable lacquer or foamable ink to the web of polymeric material, or by embossing and printing the web of polymeric material to provide embossed and printed patterns wherein the embossed and printed patterns may be in registry, out of registry or wherein a portion of the embossed and printed patterns are in registry and a portion of the embossed and printed patterns are out of registry. In addition, a matte or textured finish capable of providing the web of polymeric material 244 with an appearance and/or texture simulating the appearance and/or texture of cloth can be achieved by extruding a polymeric resin onto a matted or textured chill roll.

At least a portion of the segments of decorative grass 242 are provided with a scent 247 disposed on at least a portion of one surface thereof. The scent 247 is substantially identical to the scent 28 provided on the sheet of polymeric material 10 as described herein before with reference to FIG. 1, and the scent 247 may be disposed on or incorporated in the sheet of material from which the decorative grass 242 is formed or directly on the decorative grass 242 itself by any method described herein or known in the art.

Referring again to FIG. 21, a roll 248 of the web of polymeric material 244 having the texture and/or appearance 246 simulating the texture and/or appearance of cloth is supported on a mandrel 250 having a brake assembly 252 operably connected thereto so that the web of polymeric material 244 having a matte or textured finish 246 can be controllably withdrawn from the roll 248. The web of polymeric material 244 having the texture and/or appearance 246 simulating the texture and/or appearance of cloth is passed through a pair of tension or nip rollers 254 and 256 and into a slitter or shredder unit 258 where the web of polymeric material 244 having the texture and/or appearance 246 simulating the texture and/or appearance of cloth is slit to provide a slit web of polymeric material 260 having a plurality of strips of predetermined width. The slitting of the web of polymeric material 244 having the texture and/or appearance 246 simulating the texture and/or appearance of cloth to produce the slit web of polymeric material 244 having a plurality of strips of predetermined width can be accomplished using any well known method and device. Such common methods of slitting the web of polymeric material 244 having the texture and/or appearance 246 simulating the texture and/or appearance of cloth include: (a) slitting the web of polymeric material 244 having the texture and/or appearance 246 simulating the texture and/or appearance of cloth to produce side-by-side strips of material wherein the longer dimension of the strips is in the direction of travel of the web of polymeric material 244 having the texture and/or appearance 246 simulating the texture and/or appearance of cloth, i.e. the machine direction; or (b) slitting the web of polymeric material 244 having the texture and/or appearance 246 simulating the texture and/or appearance of cloth so that the longer dimension of the strips of material are oblique to the direction of travel of the web of polymeric material 244 having the texture and/or appearance 246 simulating the texture and/or appearance of cloth, i.e. obliquely to the machine direction.

The slit web of polymeric material 260 having a plurality of strips of predetermined width is then passed through a cutting unit 262 where the strips of the slit web of polymeric material 260 are cut into segments to form the scented decorative grass 242 having at least one surface with a matted or textured finish which provides the scented decorative grass 242 with the appearance and/or texture 246 simulating the appearance and/or texture of cloth. A segment 264 of the scented decorative grass 242 having at least one matted or textured surface 246 which provides the scented decorative grass 242 with an appearance and/or texture simulating the appearance and/or texture of cloth is illustrated in FIG. 22A.

Any conventional device and method can be employed as the slitter or shredder unit 258 for slitting of the web of polymeric material 244 to produce the slit web of polymeric material 260 having a plurality of strips of predetermined width and as the cutting unit 262 for cutting the strips of the slit web of polymeric material 260 to form the scented decorative grass 242 having the appearance and/or texture 246 simulating the appearance and/or texture of cloth.

Examples of conventional devices which can be used as the slitter or shredder unit 258 and/or as the cutting unit 262 are rotary knives, reciprocating knives, die cutting, laser cutting, water jet cutting, air jet cutting and the like.

The scented decorative grass 242 having the appearance and/or texture 246 simulating the appearance and/or texture of cloth produced by cutting the strips of the slit web of polymeric material 260 can then be conveyed to a storage area (not shown) which may be in the form of a suitable bin, or the scented decorative grass 242 having the appearance and/or texture 246 simulating the appearance and/or texture of cloth may be conveyed to a packaging machine, or conveyed to a baling machine for baling prior to storage. As other alternatives, the scented decorative grass 242 having the appearance and/or texture 246 simulating the appearance and/or texture of cloth may be placed into boxes or cartons, subjected to further processing immediately or held for subsequent processing.

Referring now to FIG. 22B, shown therein is a segment 266 of a scented decorative grass 268 having an appearance and/or texture 270 simulating the appearance and/or texture of cloth produced from the flexible sheet of laminated material 112a hereinbefore described with reference to FIG. 9B, except that both the upper and lower surfaces of the laminated material 112a are provided with a matted or textured finish simulating cloth so that the scented decorative grass 268 is also provided with a matte or textured finish which provides the texture and/or appearance 270 simulating the texture and/or appearance of cloth on an upper and lower surface 272 and 274, respectively, of the segments of the scented decorative grass 268, such as the segment 266 illustrated in FIG. 22B. However, it should be understood that the scented decorative grass 268 having the appearance and/or texture 270 simulating the appearance and/or texture of cloth can be produced from any laminated material where at least one surface of the laminated material can be modified, such as by matting or texturing, to provide the laminated material with the appearance 270 simulating cloth.

At least a portion of the segments 266 of decorative grass 268 are provided with a scent 276 disposed on at least a portion of a surface thereof. The scent 276 is substantially identical to the scent 28 provided on the sheet of polymeric material 10 as described herein before with reference to FIG. 1, and the scent 276 may be disposed on or incorporated in the sheet of material from which the decorative grass 268 is produced or may be disposed directly on the decorative grass 268 itself by any method described herein or known in the art.

The scented decorative grasses having an appearance and/or texture simulating the appearance and/or texture of cloth prepared in accordance with the present invention, such as the scented decorative grass 242 (FIG. 22A) and the scented decorative grass 268 (FIG. 22B) can also be provided with various types of curl configurations or can be crimped or otherwise modified. That is, in addition to providing the webs of material from which the scented decorative grasses are produced with a matted or textured surface which assimilates cloth, various types of curls, crimps and combinations thereof can be imparted to the webs of material prior to slitting the webs of material to produce slit webs of material, or to the slit web of material prior to cutting the slit webs of material to produce the scented decorative grasses having an appearance and/or texture simulating the appearance and/or texture of cloth. Any method or apparatus capable of imparting the desired curl and/or crimp to the webs of material so that the scented decorative grasses produced from such. webs of material possess a curl and/or crimped configuration and an appearance and/or texture simulating the appearance and/or texture of cloth can be employed to impart a curl and/or crimp to the webs of material. Examples of various methods and apparatus which may be used to impart curl configurations to the webs of material so that the decorative grasses produced from such webs of material possess a curl configuration are described in co-pending U.S. patent application U.S. Ser. No. 09/591,920, entitled "Method and Apparatus For Making Curled Decorative Grass" which is hereby expressly incorporated herein by reference. Crimping machines capable of imparting the desired crimp to the webs of material so that the decorative grasses produced from such webs of material possess a crimped configuration are well known and commercially available. One method for imparting a crimp configuration to the webs of material so that the decorative grasses produced from such webs of material possess a crimped configuration is disclosed in U.S. Pat. No. 5,891,286, entitled "Method Of Forming Curled Or Crimped Decorative Elements Having An Optical Effect", issued to Weder on Apr. 6, 1999, the specification of which is hereby expressly incorporated herein by reference.

Changes may be made in the construction and the operation of the various components, elements and assemblies described herein or in the steps or the sequence of steps of the methods described herein without departing from the spirit and scope of the invention as defined in the following claims.

What is claimed:

1. A scented decorative grass having an appearance or texture simulating the appearance or texture of cloth wherein the scented decorative grass is produced by cutting a web of polymeric material into segments, the web of polymeric material comprising:
    a sheet of polymeric material having an upper surface and a lower surface wherein at least one of the upper and lower surfaces thereof is modified to provide the sheet of polymeric material with an appearance or texture simulating the appearance or texture of cloth; and
    a scent disposed upon at least a portion of one of the upper and lower surfaces of the sheet of polymeric material such that at least a portion of the segments of decorative grass produced therefrom are provided with a scent disposed thereon.

2. The scented decorative grass of claim 1 wherein the sheet of polymeric material has a thickness in a range of about 0.1 mil to about 30 mil.

3. The scented decorative grass of claim 1 wherein the sheet of polymeric material is formed of a material selected from the group consisting of polypropylene, polyethylene, and expanded core polymeric film.

4. The scented decorative grass of claim 1 wherein the appearance or texture simulating the appearance or texture of cloth of the sheet of polymeric material is provided by at least one of printing a pattern on the sheet of polymeric material, embossing a pattern on the sheet of polymeric material and combinations thereof.

5. The scented decorative grass of claim 1 wherein the appearance or texture simulating the appearance or texture of cloth of the sheet of polymeric material is provided by at least one of flocking the sheet of polymeric material, applying a foamable lacquer or foamable ink to the sheet of polymeric material, and combinations thereof.

6. The scented decorative grass of claim 1 wherein the appearance or texture simulating the appearance or texture of cloth of the sheet of polymeric material is provided by printing a pattern on at least a portion of one of the upper and lower surfaces of the sheet of polymeric material, and wherein the scent is disposed in an ink composition utilized to print the pattern on the sheet of polymeric material.

7. The scented decorative grass of claim 1 wherein the scent is selected from the group consisting of odors normally associated with flowers, plants, vegetables, foods, grasses, food condiments, herbs, spices, woods, roots, cloth, perfumes, and combinations thereof.

8. A scented decorative grass having an appearance or texture simulating the appearance or texture of cloth wherein the scented decorative grass is produced by cutting a web of polymeric material into segments, the web of polymeric material comprising:
    a sheet of polymeric material having an upper surface, a lower surface and an embossed pattern on at least one of the upper and lower surfaces thereof wherein the embossed pattern provides the sheet of polymeric material with an appearance or texture simulating the appearance or texture of cloth; and
    a scent disposed upon at least a portion of one of the upper and lower surfaces of the sheet of polymeric material such that at least a portion of the segments of decorative grass produced therefrom are provided with a scent disposed thereon.

9. The scented decorative grass of claim 8 wherein the sheet of polymeric material is further provided with a printed pattern which cooperates with the embossed pattern to provide the sheet of polymeric material with the appearance or texture simulating the appearance or texture of cloth.

10. The scented decorative grass of claim 8 wherein the sheet of polymeric material has a thickness in a range of about 0.1 mil to about 30 mil.

11. The scented decorative grass of claim 8 wherein the sheet of polymeric material is selected from the group consisting of polypropylene, polyethylene and expanded core polymeric film.

12. The scented decorative grass of claim 8 wherein the sheet of polymeric material is further provided with a printed patern which cooperates with the embossed pattern to provide the sheet of polymeric material with the appearance or texture simulating the appearance or texture of cloth, and wherein the scent is disposed in an ink composition utilized to print the pattern on the sheet of polymeric material.

13. The scented decorative grass of claim 8 wherein the scent is selected from the group consisting of odors normally associated with flowers, plants, vegetables, foods, grasses, food condiments, herbs, spices, woods, roots, cloth, perfumes, and combinations thereof.

14. A scented decorative grass having an appearance or texture simulating the appearance or texture of cloth wherein the scented decorative grass is produced by cutting a web of polymeric material into segments, the web of polymeric material comprising:
    a sheet of polymeric material having an upper surface, a lower surface, a printed pattern on at least one of the upper and lower surfaces thereof and an embossed pattern on at least one of the upper and lower surfaces thereof, the printed pattern and the embossed pattern being in registry with one another, wherein the printed pattern and embossed pattern cooperate to provide the sheet of polymeric material with an appearance or texture simulating the appearance or texture of cloth on at least one surface thereof; and
    a scent disposed upon at least a portion of one of the upper and lower surfaces of the sheet of polymeric material such that at least a portion of the segments of decorative grass produced therefrom are provided with a scent disposed thereon.

15. The scented decorative grass of claim 14 wherein the sheet of polymeric material has a thickness in a range of about 0.1 mil to about 30 mil and is selected from the group consisting of polypropylene, polyethylene and expanded core polymeric film.

16. The scented decorative grass of claim 14 wherein the scent is disposed in an ink composition utilized to print the pattern on the sheet of polymeric material.

17. The scented decorative grass of claim 14 wherein the scent is selected from the group consisting of odors normally associated with flowers, plants, vegetables, foods, grasses, food condiments, herbs, spices, woods, roots, cloth, perfumes, and combinations thereof.

18. A scented decorative grass having an appearance or texture simulating the appearance or texture of cloth on a surface thereof wherein the scented decorative grass is produced by cutting a web of polymeric material into segments, the web of polymeric material comprising:

a sheet of polymeric material having an upper surface, a lower surface, a printed pattern on at least one of the upper and lower surfaces thereof and an embossed pattern on at least one of the upper and lower surfaces thereof, the printed pattern and the embossed pattern being out of registry with one another, wherein the printed pattern and embossed pattern cooperate to provide the sheet of polymeric material with an appearance or texture simulating the appearance or texture of cloth on at least one surface thereof; and a scent disposed upon at least a portion of one of the upper and lower surfaces of the sheet of polymeric material such that at least a portion of the segments of decorative grass produced therefrom are provided with a scent disposed thereon.

19. The scented decorative grass of claim 17 wherein the sheet of polymeric material has a thickness in a range of about 0.1 mil to about 30 mil and is selected from the group consisting of polypropylene, polyethylene and expanded core polymeric film.

20. The scented decorative grass of claim 18 wherein the scent is disposed in an ink composition utilized to print the pattern on the sheet of polymeric material.

21. The scented decorative grass of claim 18 wherein the scent is selected from the group consisting of odors normally associated with flowers, plants, vegetables, foods, grasses, food condiments, herbs, spices, woods, roots, cloth, perfumes, and combinations thereof.

22. A scented decorative grass having an appearance and texture simulating the appearance and texture of cloth wherein the scented decorative grass is produced by cutting a web of polymeric material into segments, the web of polymeric material comprising:

a sheet of polymeric material having an upper surface and a lower surface wherein at least one of the upper and lower surfaces thereof is modified to provide the sheet of polymeric material with an appearance and texture simulating the appearance and texture of cloth; and a scent disposed upon at least a portion of one of the upper and lower surfaces of the sheet of polymeric material such that at least a portion of the segments of decorative grass produced therefrom are provided with a scent disposed thereon.

23. The scented decorative grass of claim 22 wherein the sheet of polymeric material has a thickness in a range of about 0.1 mil to about 30 mil.

24. The scented decorative grass of claim 22 wherein the sheet of polymeric material is formed of a material selected from the group consisting of polypropylene, polyethylene, and expanded core polymeric film.

25. The scented decorative grass of claim 22 wherein the appearance and texture simulating the appearance and texture of cloth of the sheet of polymeric material is provided by at least one of printing a pattern on the sheet of polymeric material, embossing a pattern on the sheet of polymeric material and combinations thereof.

26. The scented decorative grass of claim 22 wherein the appearance and texture simulating the appearance and texture of cloth of the sheet of polymeric material is provided by at least one of flocking the sheet of polymeric material, applying a foamable lacquer or foamable ink to the sheet of polymeric material, and combinations thereof.

27. The scented decorative grass of claim 22 wherein the appearance and texture simulating the appearance and texture of cloth of the sheet of polymeric material is provided by printing a pattern on at least a portion of one of the upper and lower surfaces of the sheet of polymeric material, and wherein the scent is disposed in an ink composition utilized to print the pattern on the sheet of polymeric material.

28. The scented decorative grass of claim 22 wherein the scent is selected from the group consisting of odors normally associated with flowers, plants, vegetables, foods, grasses, food condiments, herbs, spices, woods, roots, cloth, perfumes, and combinations thereof.

29. A scented decorative grass having an appearance and texture simulating the appearance and texture of cloth wherein the scented decorative grass is produced by cutting a web of polymeric material into segments, the web of polymeric material comprising:

a sheet of polymeric material having an upper surface, a lower surface and an embossed pattern on at least one of the upper and lower surfaces thereof wherein the embossed pattern provides the sheet of polymeric material with an appearance and texture simulating the appearance and texture of cloth; and a scent disposed upon at least a portion of one of the upper and lower surfaces of the sheet of polymeric material such that at least a portion of the segments of decorative grass produced therefrom are provided with a scent disposed thereon.

30. The scented decorative grass of claim 29 wherein the sheet of polymeric material is further provided with a printed pattern which cooperates with the embossed pattern to provide the sheet of polymeric material with the appearance and texture simulating the appearance and texture of cloth.

31. The scented decorative grass of claim 29 wherein the sheet of polymeric material has a thickness in a range of about 0.1 mil to about 30 mil.

32. The scented decorative grass of claim 29 wherein the sheet of polymeric material is selected from the group consisting of polypropylene, polyethylene and expanded core polymeric film.

33. The scented decorative grass of claim 29 wherein the sheet of polymeric material is further provided with a printed pattern which cooperates with the embossed pattern to provide the sheet of polymeric material with the appearance and texture simulating the appearance and texture of cloth, and wherein the scent is disposed in an ink composition utilized to print the pattern on the sheet of polymeric material.

34. The scented decorative grass of claim 29 wherein the scent is selected from the group consisting of odors normally associated with flowers, plants, vegetables, foods, grasses, food condiments, herbs, spices, woods, roots, cloth, perfumes, and combinations thereof.

35. A scented decorative grass having an appearance and texture simulating the appearance and texture of cloth wherein the scented decorative grass is produced by cutting a web of polymeric material into segments, the web of polymeric material comprising:

a sheet of polymeric material having an upper surface, a lower surface, a printed pattern on at least one of the upper and lower surfaces thereof and an embossed pattern on at least one of the upper and lower surfaces thereof, the printed pattern and the embossed pattern being in registry with one another, wherein the printed pattern and embossed pattern cooperate to provide the sheet of polymeric material with an appearance and texture simulating the appearance and texture of cloth on at least one surface thereof; and a scent disposed upon at least a portion of one of the upper and lower surfaces of the sheet of polymeric material such that at least a portion of the segments of decorative grass produced therefrom are provided with a scent disposed thereon.

36. The scented decorative grass of claim 35 wherein the sheet of polymeric material has a thickness in a range of about 0.1 mil to about 30 mil and is selected from the group consisting of polypropylene, polyethylene and expanded core polymeric film.

37. The scented decorative grass of claim 35 wherein the scent is disposed in an ink composition utilized to print the pattern on the sheet of polymeric material.

38. The scented decorative grass of claim 35 wherein the scent is selected from the group consisting of odors normally associated with flowers, plants, vegetables, foods, grasses, food condiments, herbs, spices, woods, roots, cloth, perfumes, and combinations thereof.

39. A scented decorative grass having an appearance and texture simulating the appearance and texture of cloth on a surface thereof wherein the scented decorative grass is produced by cutting a web of polymeric material into segments, the web of polymeric material comprising:

a sheet of polymeric material having an upper surface, a lower surface, a printed pattern on at least one of the upper and lower surfaces thereof and an embossed pattern on at least one of the upper and lower surfaces thereof, the printed pattern and the embossed pattern being out of registry with one another, wherein the printed pattern and embossed pattern cooperate to provide the sheet of polymeric material with an appearance and texture simulating the appearance and texture of cloth on at least one surface thereof; and a scent disposed upon at least a portion of one of the upper and lower surfaces of the sheet of polymeric material such that at least a portion of the segments of decorative grass produced therefrom are provided with a scent disposed thereon.

40. The scented decorative grass of claim 39 wherein the sheet of polymeric material has a thickness in a range of about 0.1 mil to about 30 mil and is selected from the group consisting of polypropylene, polyethylene and expanded core polymeric film.

41. The scented decorative grass of claim 39 wherein the scent is disposed in an ink composition utilized to print the pattern on the sheet of polymeric material.

42. The scented decorative grass of claim 39 wherein the scent is selected from the group consisting of odors normally associated with flowers, plants, vegetables, foods, grasses, food condiments, herbs, spices, woods, roots, cloth, perfumes, and combinations thereof.

* * * * *